(12) United States Patent
Shkolnik

(10) Patent No.: US 7,191,738 B2
(45) Date of Patent: Mar. 20, 2007

(54) LIQUID PISTON INTERNAL COMBUSTION POWER SYSTEM

(75) Inventor: Nikolay Shkolnik, W. Hartford, CT (US)

(73) Assignee: LiquidPiston, Inc., West Hartford, CT (US)

( * ) Notice: Subject to any disclaimer, the term of this patent is extended or adjusted under 35 U.S.C. 154(b) by 143 days.

(21) Appl. No.: 10/505,788

(22) PCT Filed: Feb. 26, 2003

(86) PCT No.: PCT/US03/05749

§ 371 (c)(1),
(2), (4) Date: Aug. 25, 2004

(87) PCT Pub. No.: WO03/074840

PCT Pub. Date: Sep. 12, 2003

(65) Prior Publication Data

US 2005/0166869 A1    Aug. 4, 2005

Related U.S. Application Data

(60) Provisional application No. 60/360,955, filed on Feb. 28, 2002.

(51) Int. Cl.
*F02B 75/00* (2006.01)
*F01L 7/00* (2006.01)

(52) U.S. Cl. .................................. 123/19; 123/190.6
(58) Field of Classification Search ................ 123/19, 123/190.6
See application file for complete search history.

(56) References Cited

U.S. PATENT DOCUMENTS

| 1,144,921 | A | * | 6/1915 | Stever .................. 123/190.6 |
| 2,091,411 | A | | 8/1937 | Mallory |
| 2,658,486 | A | * | 11/1953 | De Waide .................. 123/19 |
| 3,010,440 | A | | 11/1961 | Roth |
| 3,139,837 | A | * | 7/1964 | Levi .................. 417/105 |
| 3,815,555 | A | | 6/1974 | Tubeuf |
| 3,998,049 | A | | 12/1976 | McKinley et al. |
| 5,072,589 | A | | 12/1991 | Schmitz |
| 5,127,369 | A | | 7/1992 | Goldshtik |
| 5,623,894 | A | | 4/1997 | Clarke |
| 5,799,636 | A | | 9/1998 | Fish |
| 5,950,579 | A | | 9/1999 | Ott |
| 5,992,356 | A | | 11/1999 | Howell-Smith |
| 6,058,901 | A | | 5/2000 | Lee |
| 6,112,522 | A | | 9/2000 | Wright |
| 6,202,416 | B1 | | 3/2001 | Gray, Jr. |
| 6,230,671 | B1 | | 5/2001 | Achterberg |
| 6,318,309 | B1 | | 11/2001 | Burrahm et al. |
| 6,609,371 | B2 | | 8/2003 | Scuderi |
| 6,668,769 | B1 | | 12/2003 | Palazzolo |
| 6,722,127 | B2 | | 4/2004 | Scuderi et al. |
| 6,752,104 | B2 | | 6/2004 | Fiveland et al. |
| 6,752,133 | B2 | | 6/2004 | Arnell |

FOREIGN PATENT DOCUMENTS

EP    034505 5 A2 * 12/1989
RU    2018004 C1 *  8/1994

* cited by examiner

*Primary Examiner*—Noah P. Kamen
(74) *Attorney, Agent, or Firm*—Bromberg & Sunstein LLP

(57) ABSTRACT

Methods, devices, and systems for power generation through liquid piston internal combustion engine. The liquid piston internal combustion engine of the invention utilizes a novel, synergetic combination of internal combustion and steam piston engines within the framework of one and the same system. The engine may comprise a plurality of cylinders, each having a liquid piston.

15 Claims, 13 Drawing Sheets

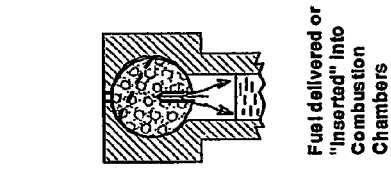

Fig. 11g)
Air Compressed, Both Ports Closed (Compression Phase)
Valve Opening

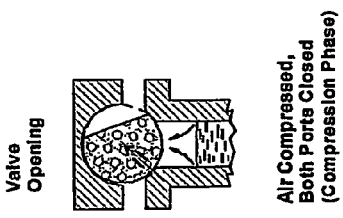

Fig. 11f)
Intake Port Opened (Intake Phase)
Air

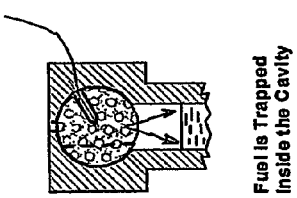

Fig. 11k)
Fuel delivered or "Inserted" Into Combustion Chambers

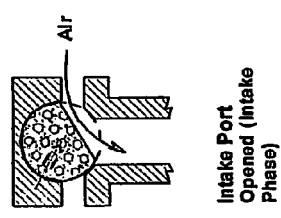

Fig. 11e)
Exhaust Port Opened (exhaust Phase)
Exhausts

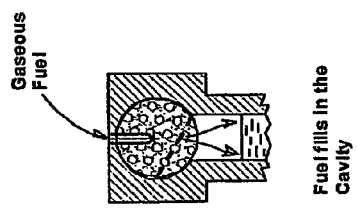

Fig. 11j)
Fuel is Trapped Inside the Cavity
Low Pressure Fuel Cavity

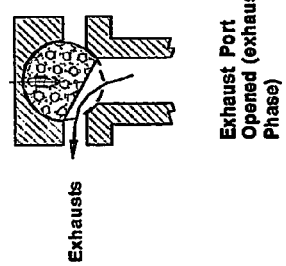

Fig. 11i)
Fuel fills in the Cavity
Gaseous Fuel

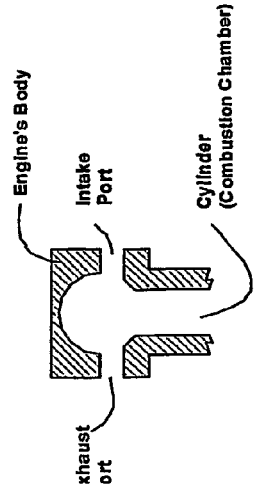

Fig. 11d)
Engine's Body
Intake Port
Cylinder (Combustion Chamber)
Exhaust Port

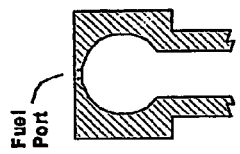

Fig. 11h)
Fuel Port

LIQUID PISTON INTERNAL COMBUSTION POWER SYSTEM

CROSS-REFERENCE TO RELATED APPLICATIONS

This application is the national phase of International (PCT) Patent Application Ser. No. PCT/US03/05749, filed Feb. 26, 2003 and published under PCT Article 21(2) in English, which claims priority to and the benefit of U.S. provisional application Ser. No. 60/360,955, filed Feb. 28, 2002. The disclosures of each of these applications are incorporated herein by reference.

BACKGROUND

This invention relates generally to methods, devices and systems for power generation and conversion. More particularly it relates to power generation through piston heat engines and even more specifically, it relates to synergistic combination of liquid piston type internal combustion and steam engines.

TECHNICAL CHARACTER

The technical character of this invention resides in reduced pollution, high efficiency liquid piston engine for power generation that combines the best features of the internal combustion engine as well as the steam engine. Further technical character resides in its six technical modules viz PGM (Power Generating Module), ERS (Energy Recovery System), PCM (Power Conversion Module), HSA (Hydraulic Shock Absorbers Module), DAC (Data Acquisition & Control Module) and AEM (Auxiliary Equipment Module).

THE PROBLEM

In general, piston engines are based on the principle that the working fluid (gas) undergoing an expansion is contained within an enclosed volume formed by the engine's body (generically referred as "cylinder") and a piston.

The piston transfers the energy of expanding working fluid to user definable means, while restricting this volume without leakage. Internal combustion engines ("ICE"), in spite of almost 150 years history of development, still suffer from relatively low efficiency, relatively high levels of harmful exhausts, and load-dependant performance, among other problems.

The efficiency of heat engines is low due to theoretical thermodynamic limitations of ideal cycles as well as additional energy losses due to deviations from ideal cycles and friction between moving parts. In the best case, only about 30% of the chemical energy of the fuel is converted into useful work. About 40% is removed as heat by the cooling water, while the remaining 30% is lost with the exhausts gases.

Various gases, harmful for environment and humans, such as unburned fuel, $NO_x$ and others are expelled with the engine's exhausts, mainly due to a very limited ability to control the combustion process.

Further, the efficiency of heat engines is normally optimized for a narrow range of power loads. In reality, these engines seldom operate in these optimal ranges, thus further reducing operating efficiencies.

The problem with prior art internal combustion engines can be categorized into the following:
 a) Low efficiency.
 b) High Pollution Exhaust
 c) Performance not independent of load.
 d) Not cost effective
 e) Not easy to install, use, operate and maintain.

SUMMARY

This invention comprises methods, devices and system for power generation and conversion. The ICE (Internal Combustion Engine) system comprises six modules viz PGM (Power Generating Module), 100, ERS (Energy Recovery System) 200, PCM (Power Conversion Module) 300, HSA (Hydraulic Shock Absorbers Module) 400, DAC (Data Acquisition & Control Module) 500 and AEM (Auxiliary Equipment Module) 600.

Prior Art

A prior art search was neither conducted nor commissioned but inventor is intimately familiar with the prior art None of the prior art devices known to the applicant or his attorney disclose the EXACT embodiment of an efficient liquid piston engine.

Objectives

Luckily for the inventor none of the prior art devices singly or even in combination provide for all of the objectives as established by the inventor for this system as enumerated below.

1. It is an objective of this invention to provide methods, devices and system for power generation through liquid piston internal combustion engine.

2. Another objective of this invention is to provide a very high efficiency system.

3. Another objective of this invention is that the exhaust system of this invention has substantially lower pollution by reducing the amount of $NO_x$ and unburned hydrocarbons.

4. Another objective of this invention is that it be reliable such that it practically never fails and requires little or no maintenance.

5. Another objective of this invention is that it be physically safe in normal environment as well as accidental situations.

6. Another objective of this invention is to synergistically combine best features of internal combustion and steam piston engines within the framework of one and the same system.

7. Another objective of this invention is to reduce wasted heat energy through partial recuperation of rejected heat energy.

8. Other objectives of this invention reside in its simplicity, elegance of design, ease of manufacture, service and use as will become apparent from the following brief description of the drawings and the detailed description of the concept embodiment.

Luckily for the inventor none of the prior art devices singly or even in combination provides all of the features established by the inventor for this system as enumerated below.

a) High efficiency liquid piston internal combustion engine
 b) Highly efficient source of mechanical and/or electrical power
 c) Reduced pollution
 d) Suitable for multiple uses including transportation.

BRIEF DESCRIPTION OF THE DRAWINGS

These objects and features of the invention shall now be described in relationship to the following drawings where in the Power Generating Module ("PGM") carries reference numbers in 100's, Energy Recovery System ("ERS") in 200's, the Power Conversion Module ("PCM") in 300s, the Hydraulic Shock Absorbers Module ("HSA"), in 400s, the Data Acquisition and Control Module ("DAC") in 500s, the Auxiliary Equipment Module ("AEM"), in 600's.

Figure 7:
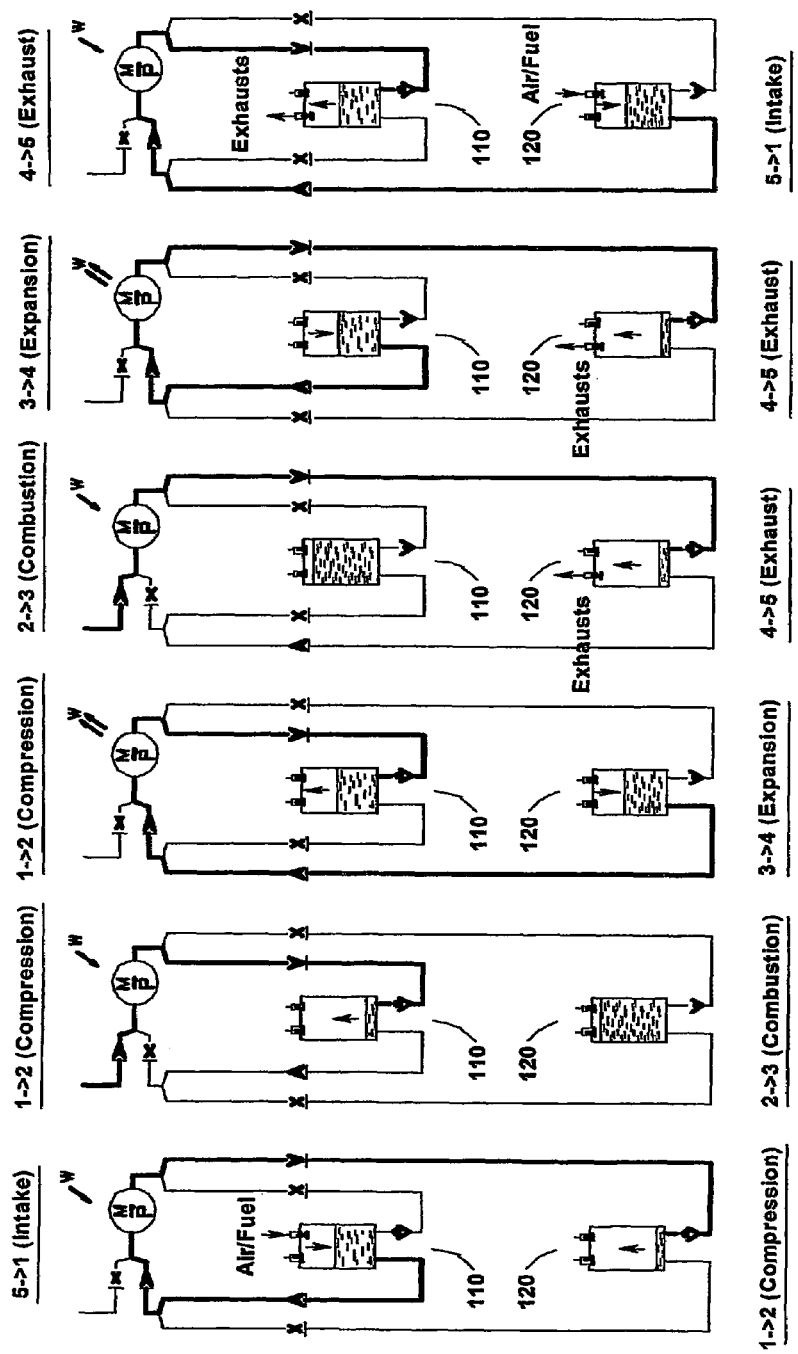
Figure 8:
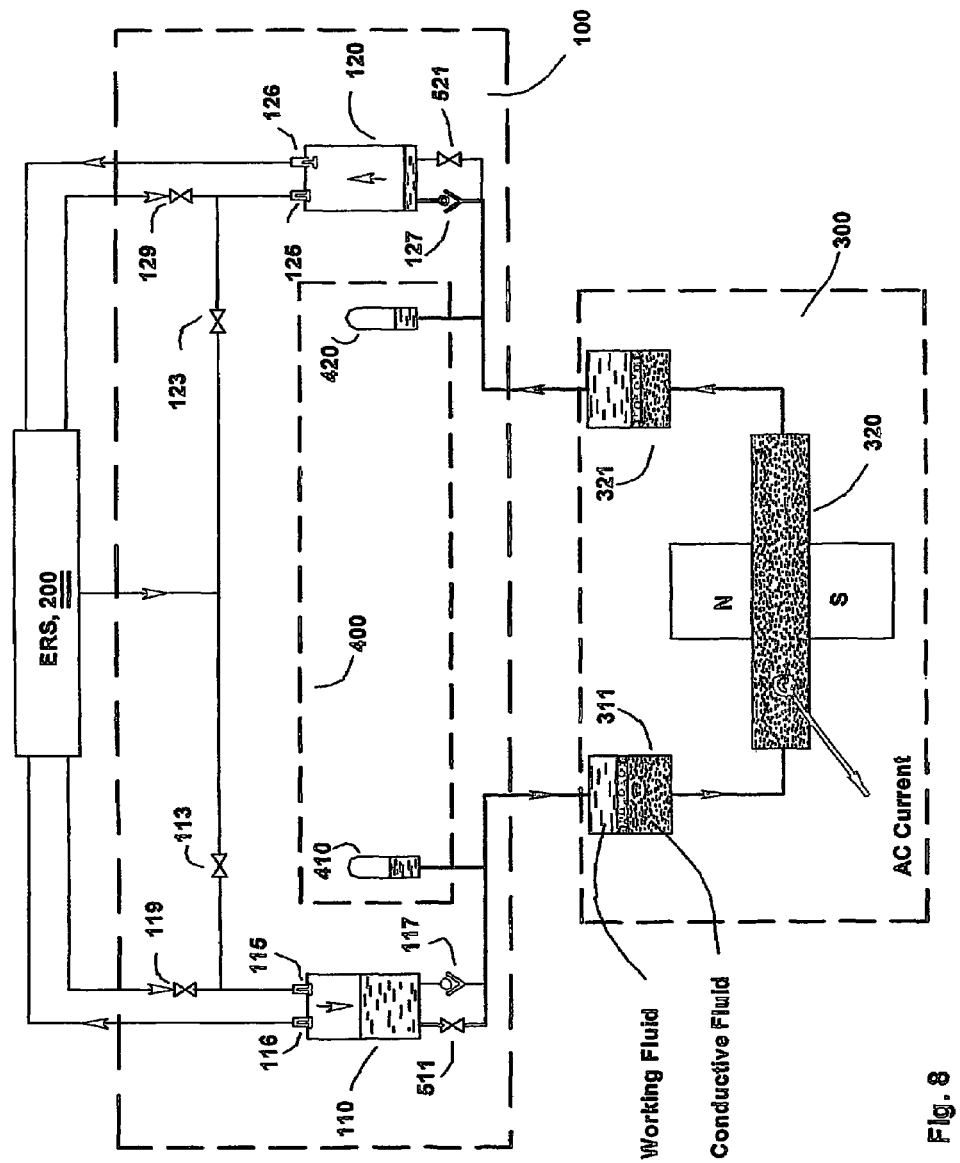
Figure 9:
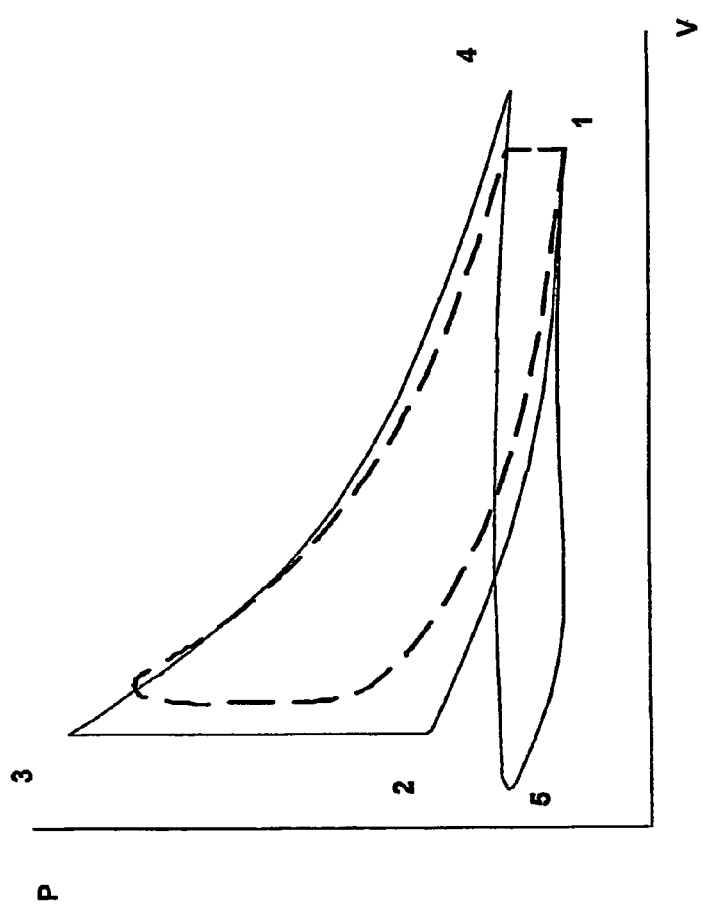
Figure 10:
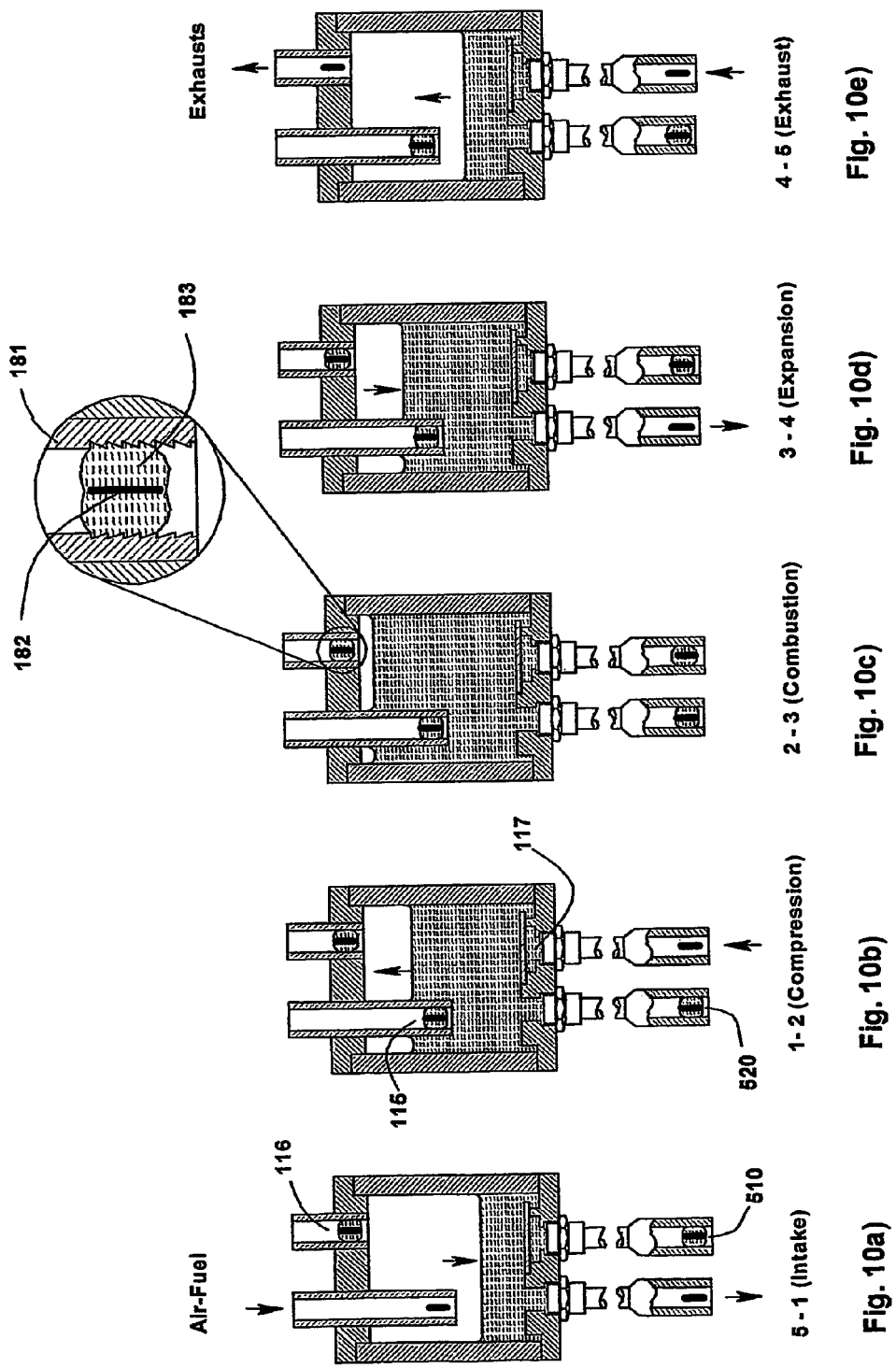
Figure 11:
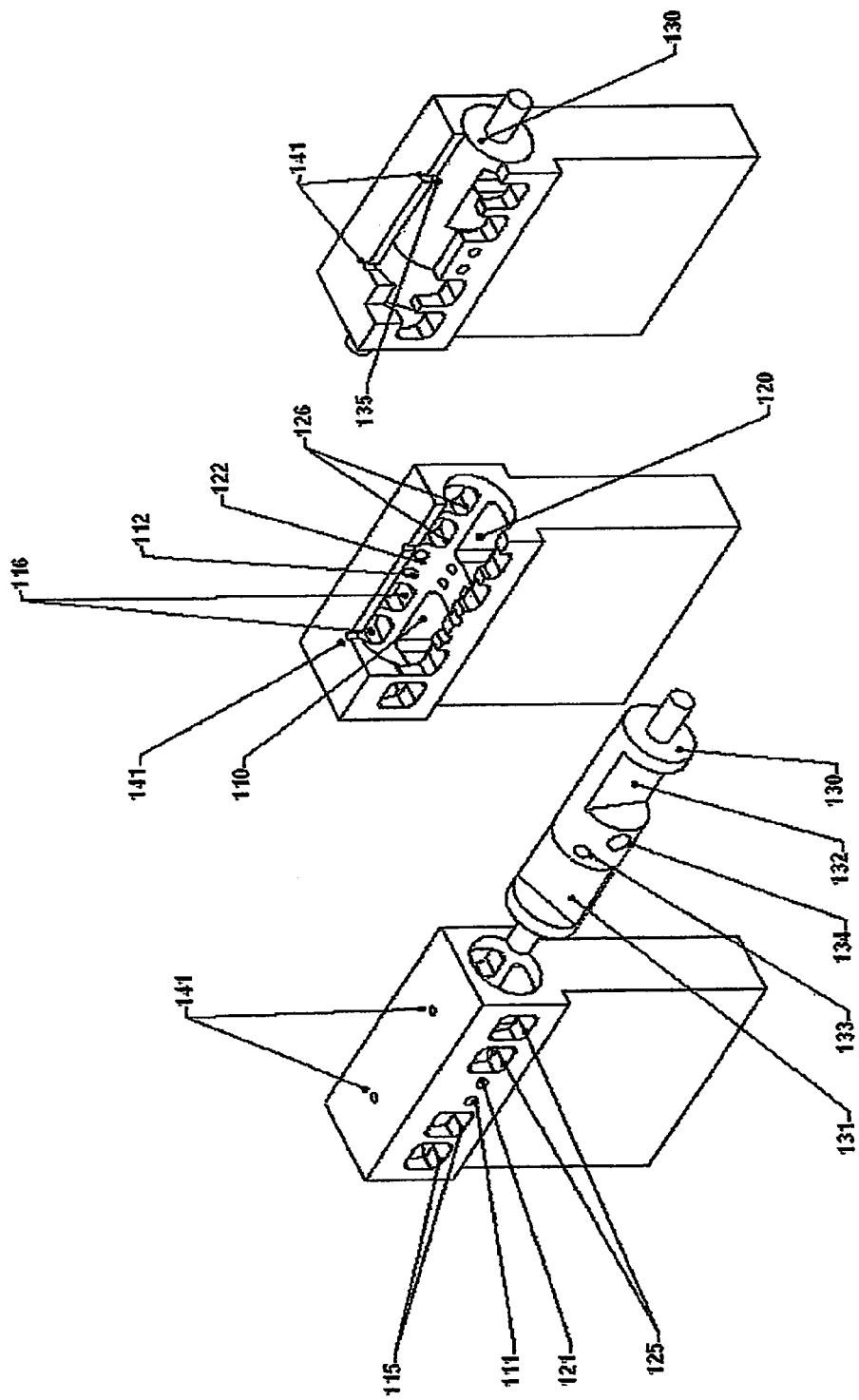
Figure 12:
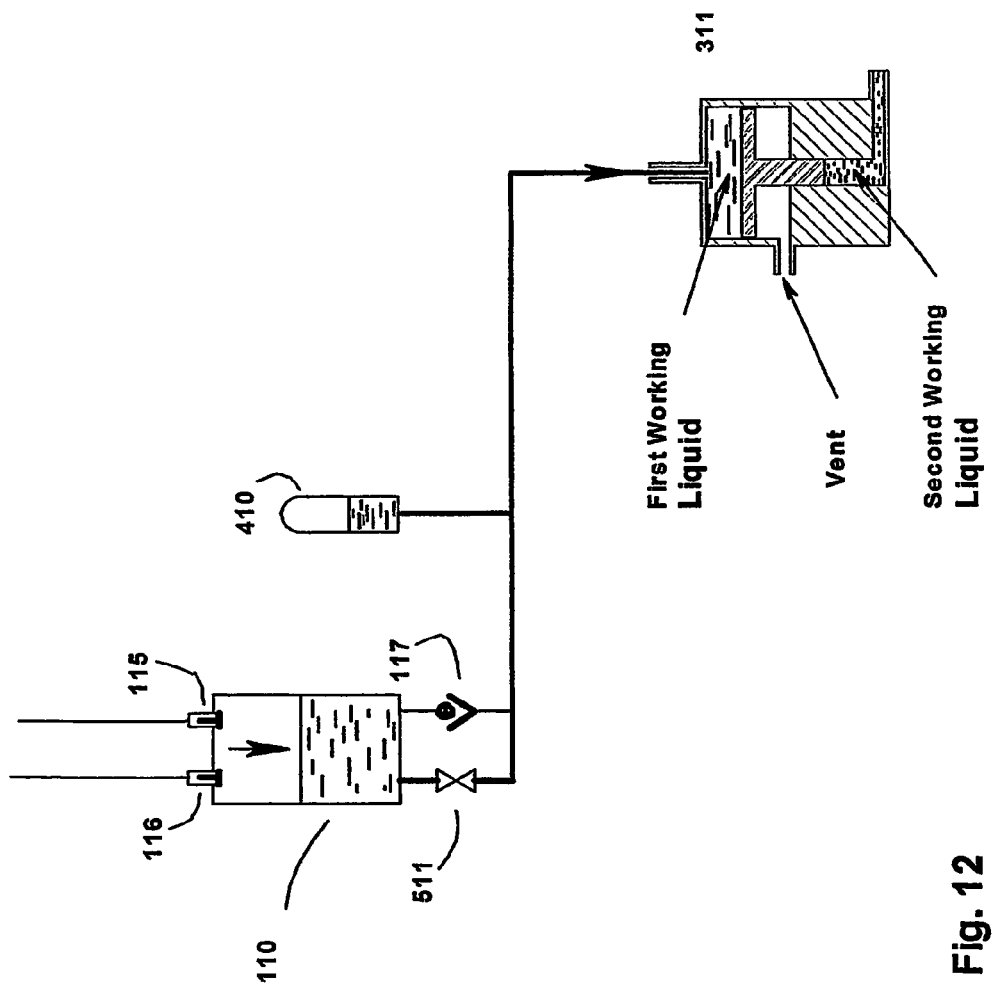

g) FIG. 7 describes operational sequence of an LPICPS working in a 5-phase, 4-stroke cycle wherein further:
  (i) FIG. 7(*a*) shows one cylinder undergoing through Intake phase, while other cylinder undergoing through Compression phase.
  (ii) FIG. 7(*b*) shows one cylinder undergoing through Compression phase, while other cylinder undergoing through Combustion phase.
  (iii) FIG. 7(*c*) shows one cylinder undergoing through Compression phase, while other cylinder undergoing through Expansion phase.
  (iv) FIG. 7(*d*) shows one cylinder undergoing through Combustion phase, while other cylinder undergoing through Exhaust phase.
  (v) FIG. 7(*e*) shows one cylinder undergoing through Expansion phase, while other cylinder undergoing through Exhaust phase.
  (vi) FIG. 7(*f*) shows one cylinder undergoing through Exhaust phase, while other cylinder undergoing through Intake phase.

h) FIG. 8 is a block-diagram describing a variation of the PGM and PCM based on an exemplary magnetohydrodynamic generator/pump combination.

i) FIG. 9 is a P-V diagram of LPICPS and standard ignition engine operating under Otto cycle.

j) FIG. 10 describes operational sequence of LPICPS utilizing electrorheological fluid, which allows implementation of valves without moving parts wherein further:
  (i) FIG. 10(*a*) shows a cylinder undergoing through Intake phase.
  (ii) FIG. 10(*b*) shows a cylinder undergoing through Compression phase.
  (iii) FIG. 10(*c*) shows a cylinder undergoing through Combustion phase.
  (iv) FIG. 10(*d*) shows a cylinder undergoing through Expansion phase.
  (v) FIG. 10(*e*) shows a cylinder undergoing through Exhaust phase.

k) FIG. 11 is an exemplary embodiment of the 2-cylinder engine with a single rotary valve with optional low pressure fuel cavity for Low Pressure Fuel Insertion wherein further:
  (i) FIG. 11(*a*) shows exploded view of engine block and a Rotary Valve.
  (ii) FIG. 11(*b*) shows cutout view of engine block
  (iii) FIG. 11(*c*) shows assembled view of cutout engine block and a Rotary Valve.
  (iv) FIG. 11(*d*) is a cross section of the engine block, showing intake and exhaust ports.
  (v) FIG. 11(*e*), (*f*) and (*g*) show position of Rotary Valve during Exhaust, Intake and Compression phases.
  (vi) FIG. 11(*h*) is a cross section of the engine block, showing fuel port.
  (vii) FIG. 11(*i*), (*j*) and (*k*) show the position of Low Pressure Fuel Cavity at various positions during Rotary Valve rotational travel.

i) FIG. 12 is an exemplary embodiment of booster for changing the type or pressure of working liquid.

DETAILED DESCRIPTION OF THE BEST MODE PREFERRED EMBODIMENT

Figure 1:
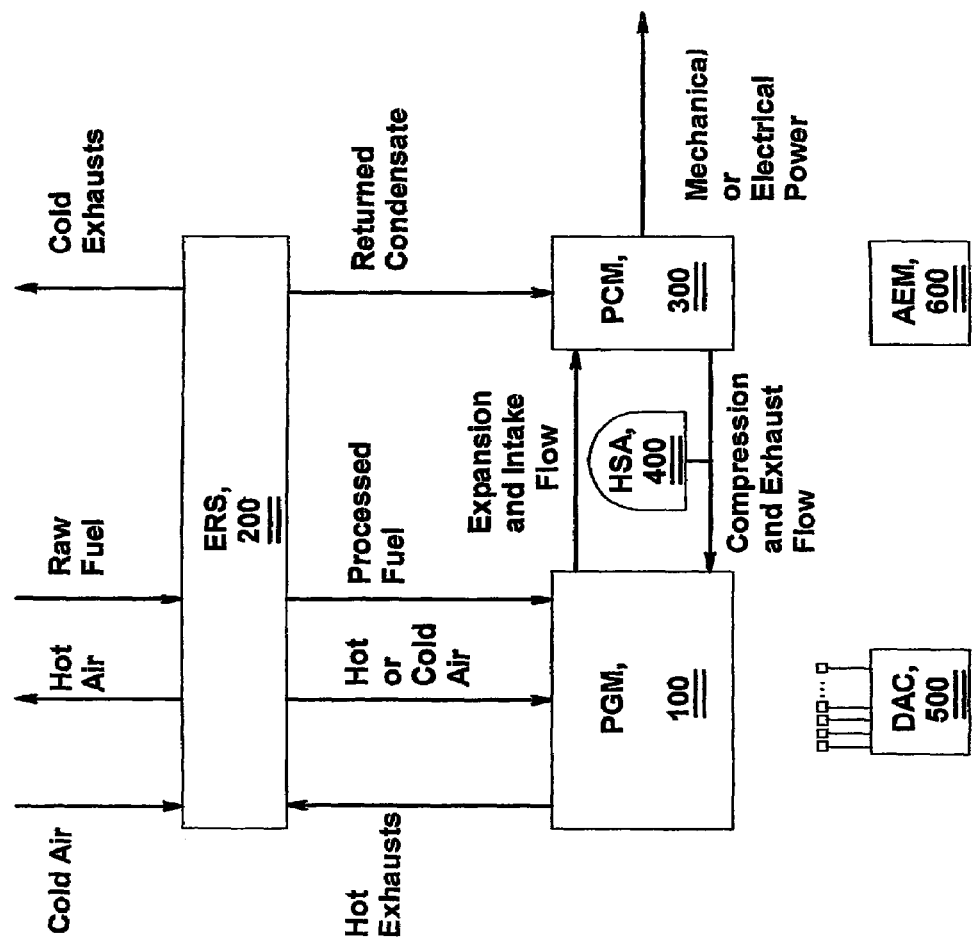
FIG. 1 is a block-diagram of an exemplary LPICPS.

As shown in the drawings wherein like numerals represent like parts throughout the several views or figures, there is generally disclosed in FIG. 1 is a Power Generating Module, 100, that a) converts chemical energy of fuel into the kinetic energy of working liquid, which is then sent to a PCM, 300, and b) receives the return fluid from PCM, 300.

Figure 2:
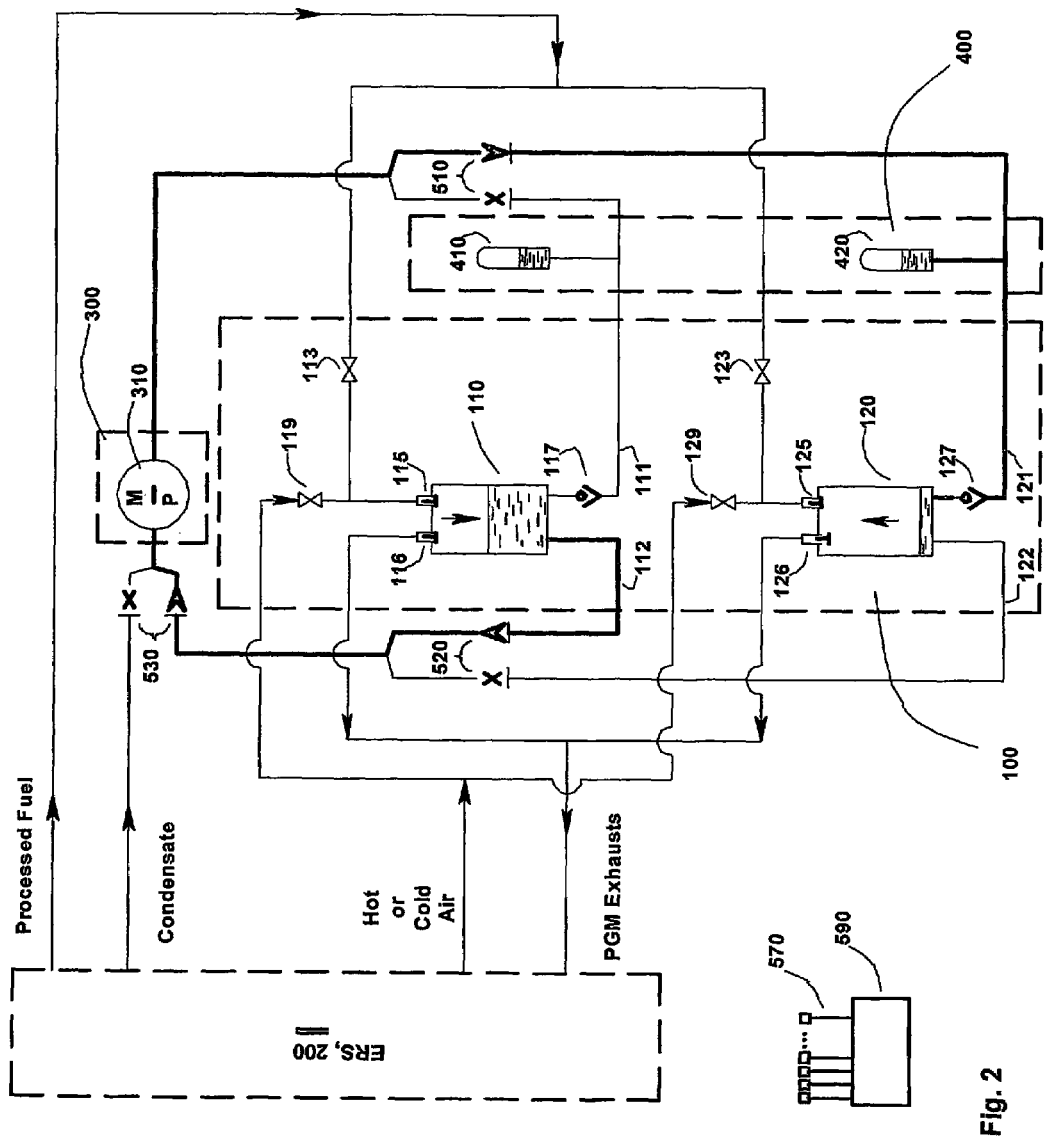
FIG. 2 is an exemplary block-diagram of the LPICPS main module, the PGM.
Figure 3:
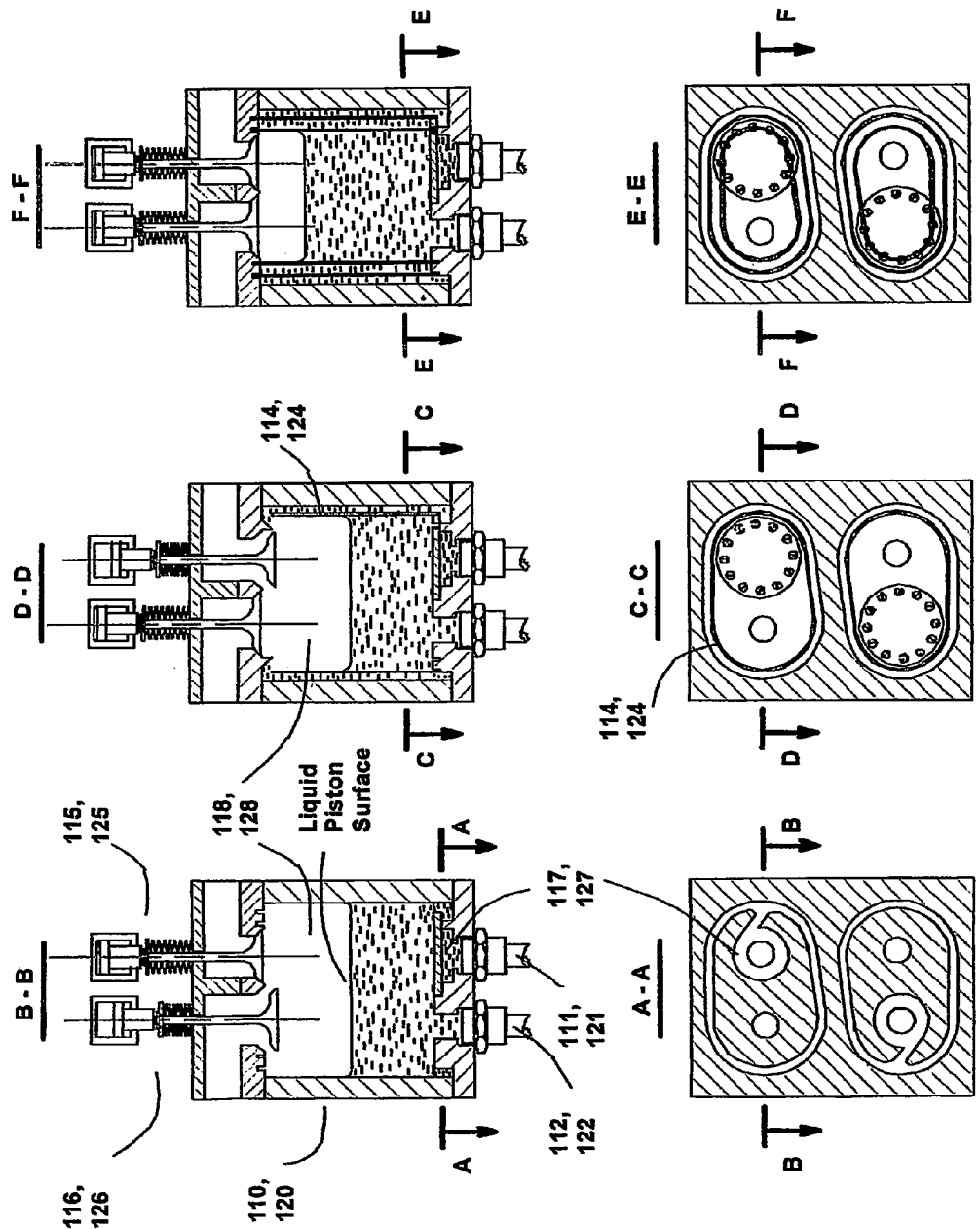
FIG. 3 shows a few exemplary embodiments of physical implementation of a PGM, wherein further:
  (i) FIG. 3(*a*) shows two cross-sections of simple two-cylinder system.
  (ii) FIG. 3(*b*) shows two cross-sections of two-cylinder system with single thin-wall cylinder.
  (iii) FIG. 3(*c*) shows two cross-sections of two-cylinder system with double thin wall cylinder.

Referring now to FIG. 2, the PGM, 100, is comprised of one or more cylinders (110, 120) with liquid pistons and a system of valves and optional spark plugs. The cylinders have design similar to cylinders of an ICE, except that the metal piston is replaced by a liquid piston, and therefore the cylinder does not necessarily need a cylindrical shape. For example, FIG. 3 shows a cylinder which has generally an oval cross-section, while FIG. 11*a*) -FIG. 11*c*) show a cylinder which has generally a rectangular shape. Also, the cylinder may have additional elements, which could be placed inside the cylinder's cavity, such as valves—see FIG. 10. In addition to intake valves (115, 125) and exhaust valves (116, 126), the cylinders are equipped with input ports (111, 121) and output ports (112, 122). Check-valves (117, 127) allow liquid to flow into one direction only, and directional valves 510 and 520 control liquid inflow and outflow, correspondingly. While conventional poppet-type intake and exhaust valves are shown on FIGS. 2, 3, 4, 7, 8 and 12 for clarity of description, the rotary valve, shown on FIG. 11*a*)–FIG. 11*c*), could be used as well.

Such a rotary valve may contain optional low pressure fuel cavity or cavities for Low Pressure Fuel Insertion (LPIFI), as well as directional valves 510, 520 and 530 could be synchronized with main operational sequence by linking it with the output shaft of Power Conversion Module, 300, or by separate computer controlled electrical motor. Two independently driven valves of this type could be used as well.

Because piston's motion is governed by valve's opening and dosing sequence and due to a generally desired feature of constant volume (isochoric) combustion, which will be explained in detail later, the combustion cycle in LPICPS is broken into five phases: Intake, Compression, Combustion, Expansion, and Exhaust Referring to the piston's motion, this combustion cycle can still be technically qualified as a 4-strokes (down-up-down-up), though in present invention this is implemented as (down-up-STOP-down-up), or as a 2-strokes (up-down), though in present invention this is implemented as (up-STOP-down).

Referring now to FIG. 1, the optional Energy Recovery System, 200, a) recovers significant part of heat from the exhausts gases and b) if necessary, condenses water from the exhausts gases.

The recovery can be accomplished by:
1. Reforming an incoming raw fuel into a processed fuel (reformat), wherein the heat of combustion is higher than the corresponding heat of combustion of raw fuel, as demonstrated in prior art [U.S. Pat. Nos. 4,900,333; 5,501,162; and 5,595,059 and publications: "Increasing the Effectiveness of Fuel Utilization in Power Generation, Industry and Transportation" by V. G. Nosach, Kiev, U.S.S.R., 14–15, 1989; "The Thermo-chemical Recuperator System—Advanced Heat Recovery, By D. K. Fleming and M. J. Khinkis, $12^{th}$ Energy Technology Conference and Exposition, Washington D.C. Mar. 25–27, 1985]. This is only possible if reforming is an endothermic process, i.e. requires additional heat. Hot exhausts from the PGM supply the needed heat for the reforming reaction. Therefore, any fuel satisfying this requirement is suitable for use by the LPICPS. Examples of such fuels are some hydrocarbon fuels, such as natural gas (NG). There are number of possible ways to implement the Energy Recovery System, which utilizes the fuel reforming method; some of them will be described later.
2. Dissociation of water (steam) molecules in the presence of a catalyst and possibly assisted by electric spark discharge into Hydrogen and Oxygen. A similar method is shown in U.S. Pat. No. 5,156,114 which is incorporated herein by reference. The heat generated during the air/fuel mixture compression may supply a significant part of the energy needed for such dissociation. Hydrogen generated in the process of dissociation is used during combustion. Thus, the net effect of this process is partial recovery of heat of compression.
3. Preheating the air needed for combustion.
4. The combination of all mechanisms above either alone or in combination.

NOTE: It also may be necessary to recover the water contained in the exhausts. This can also be accomplished by the ERS. It should be also noted that while functionally a separate module, the ERS could be physically located within the boundaries of the PGM.

The Power Conversion Module, 300, a) converts kinetic energy of the working liquid into the end user form: mechanical energy of rotating shaft(s) or electrical energy and using part of the energy supplied by the working liquid b) pumps out the working liquid from cylinders of PGM during the intake phase; c) pumps working liquid back into the cylinders of PGM during the compression and exhaust phases; and d) if needed, pumps out condensate of working liquid from the ERS, 200.

Transformation into mechanical energy may occur in devices such as a hydraulic motor, which in turn can rotate and move a useful load such as car's transmission or wheels, if more then one hydraulic motor is used. Alternatively, such a hydraulic motor can drive an electrical generator to produce electricity. It is also possible to convert the kinetic energy of the working liquid into the electricity directly, as will be described later. It should be noted that physically, the PCM could be a stand-alone unit or it could be integrated with PGM.

Because the PCM is used for pumping out the working liquid as well, it is preferable to use high efficiency reversible motors/pumps, such as roll-vane pump/motor as shown at website: "http://www.indiatradezone.com/cosrc/view/products/productdetails.asp?objid=1043 2&prd=8755". These units work as hydraulic motors when high pressure is supplied and as pumps when driven by external sources. A flywheel could be utilized effectively to drive the unit when high-pressure expansion flow is switched off. A flywheel gains the energy during the expansion phases of the engine and powers the pump during intake, compression and exhaust phases, as will be explained in detail later.

Referring to FIG. 2, an optional Hydraulic Shock Absorbers, 400, a) absorbs the energy of the flowing working liquid when the PGM is shutoff (during combustion, for example); and b) releases this energy to the flowing working liquid, during the expansion phase.

The Data Acquisition and Control, 500, on the bases of information it receives from the sensors located within PGM, PCM and ERS, controls the direction of the working liquid flow to through directional valves 510, 520, and 530, combustion timing, and sequencing of PGM intake (115, 125) and exhaust (116, 126) valves. DAC system is also responsible for optimization of energy consumption during various power level operation of the system. The sensor group may comprise sensors for pressure, level, temperature, oxygen and any other suitable parameters' measurements.

Finally, the Auxiliary Equipment Module provides auxiliary functions to the LPICPS, and may have such an optional components as:
- Electrical power source (such as battery and power conditioning unit) for start-up of the engine and/or DAC operation;
- Electrical starter;
- High-pressure accumulator that could also be used for start-up or braking energy recovery. This accumulator could be stand-alone unit or, alternatively, it could be combined with HSA;
- Additional accumulator for driving the directional control valves or hydraulic valve lifters, and the like;
- Additional heat exchanger(s), which may be required for cooling of returned water ("radiator") could be installed, say, before the PCM; and
- A separate cylinder in which working liquid may compress air for use in a two-stroke engine, and the like.

Definitions

The necessary part of every thermodynamic system is a working body or a working fluid—normally gas, vapors (steam) or liquid, which may exist in different phases. Due to the fact that several such working fluids exist within the design variations of the proposed LPICPS and to facilitate further description, the following terminology will be used.

Working gas—a mixture of product of combustion and vapor(s) of working liquid that exists within the cylinder of the LPICPS during combustion and expansion strokes.

Exhausts are a working gas expelled from the cylinder after combustion stroke. These exhausts may undergo a number of changes throughout the various elements of LPICPS. To distinguish one type of exhaust from another they may be identified by the name of the element they are exhausted from, such as cylinder exhausts, vortex tube exhausts, and the like.

Working liquid—water or other liquid suitable for use in the LPICPS.

There may be more then one type of working liquids within LPICPS.

Expansion flow—flow of working liquids from the cylinder of a PGM under the pressure of working gases during the expansion stroke. The useful work is extracted from the working liquid during this drive flow within the PCM.

Compression flow—flow of working liquids into the cylinder of a PGM under the pressure generated by the PCM. This flow compresses the fresh air or air/fuel mixture within the cylinder of the PGM.

Exhaust flow—flow of working liquids into the cylinder of PGM under the pressure generated by a PCM. The cylinder exhausts are expelled from the cylinder of the PGM during this flow conditions.

Intake flow—flow of working liquids from the cylinder of PGM under the pumping action of the PCM.

Working Fluid Types

There are a plurality of working liquids that could be used for different embodiments of the PGM. Some examples are:
1. Water—allows the simplest implementation of PGM and PCM;
2. Water mixed with other liquids to satisfy the needs of the system, such as antifreeze, to enable winter operation without drainage of the system; or binary or ternary mixtures;
3. Aqua-based electrorheological fluids, which allow very simple implementation of all hydraulic valves without any moving parts (FIG. 10). These valves are characterized by ultra-fast response—on the order of milliseconds [*Proceedings of the* 1999 *SPIE Tele-manipulator and Telepresence Technologies VI Conference,* Boston, Mass. Sep. 19–22, 1999, Vol 3840, pp. 88–99.], and are very simple to control;
4. Mixed systems, which might have different types of working liquids to be used in different parts of the liquid circuit. For example, water or binary or ternary liquid may be used in the PGM, while the PCM may use liquids with properties that better suit the design intent, such as hydraulic oil, electrorheological fluids, or electro-conductive fluid. Boosters may be installed to convert PGM working fluid into a different type and/or pressure of the PCM working liquid.

Power Generating Module

The Power Generating Module, 100, a) converts chemical energy of fuel into the kinetic energy of a working liquid, which is then sent to PCM, 300, and b) receives the return fluid from PCM, 300.

Piston engines are based on the principle that the working gas undergoing an expansion is contained within an enclosed volume formed by the engine's body (generically referred as "cylinder") and a piston (a movable body that transfers the energy of expanding working fluid to user definable means, while restricting this volume without leakage). Thus, a conversion of chemical energy of fuel into the kinetic energy of working liquid (or, more precisely, movable liquid piston, as will be explained later) occurs, as is the case of all piston engines, inside of the cylinder.

The Power Generating Module (PGM), 100, has one or more cylinders. The preferred embodiment includes at least one pair of cylinders 110 and 120 and possibly two or more pairs. An odd number of cylinders is also possible. If a single cylinder system is used, an additional holding vessel may be needed to hold working liquid downstream from PCM and upstream from PGM.

FIG. 3 shows some examples of physical implementations of two-cylinder systems. Many other implementations within framework of this idea are also possible.

One, particularly simple embodiment of this invention is shown on FIGS. 3*a*), 3*b*) and 3*c*) Defining, for the sake of the description, an enclosed volume formed by the engine's cylinder and a movable surface of working liquid piston as a "cavity" or a "chamber", this cavity can be of an arbitrary shape. Other than these differences, compared to conventional piston engines, all other components may be similar in design and intent. For example, the PGM may have intake valves (115, 125) and exhaust valves (116, 126), which could be driven by conventional lobe cams or, preferably, by hydraulics or electromagnets or both. Also, rotary valves with optional low pressure fuel cavity or cavities for Low Pressure Fuel Insertion could be used instead of conventional intake and exhaust Valves.

The cylinder may be equipped with an optional spark plug (not shown), if precise ignition timing is desired or if we want to implement energy recovery by means of dissociation of some of the water molecules, as will be described below. Direct fuel injectors (not shown) may be installed into the cylinders as well as is well known to those of ordinary skill in the pertinent art. Alternatively, raw or reformat fuel could be delivered by means of rotary intake/exhaust valves equipped with low pressure fuel cavity or cavities for Low Pressure Fuel Insertion, as shown on FIG. 11 and described below.

Referring to FIG. 2 and FIG. 3, the Cylinder 110 has intake valve 115 and exhaust valve 116 and, shown as poppet valves for simplicity of description, optional sparkplug and/or direct injection valve (not shown on FIG. 1). Similarly, the cylinder 120 has intake valve 125 and exhaust valve 126 and, optional sparkplug and/or direct injection valve (also not shown).

Directional valve 510 allows liquid flow into either cylinder 110 or cylinder 120. Directional valve 520 allows liquid flow from either cylinder 110 or cylinder 120. Check-valves 117 and 127 protect the PCM from the backflow from cylinders 110 or 120 through input ports 111 or 121 when cylinders fire and during the expansion cycles. It has to be understood that additional valves and/or connecting lines, may be necessary for embodiments having other then two cylinders.

The check-valves could be of conventional types (ball, poppet, etc.) or, preferably, fluidic diodes (Tesla, vortex, or any other type) because they do not have moving parts. One such embodiment is shown on FIG. 3—vortex diode (check-valves 117 or 127).

Alternate Embodiments

In an alternate embodiment, shown on FIG. 11*a*) through FIG. 11*d*) raw or reformat fuel can be delivered into the engine's cylinder by means of rotary intake/exhaust valves equipped with low pressure fuel cavity or cavities for Low Pressure Fuel Insertion, after fresh air charge has been compressed to desired pressure and temperature. FIGS. 11*a*), 11*b*) and 11*c*) show some of the same valves (using the same numerals) as shown in FIG. 2 and FIG. 3.

The pressure and temperature of the compressed air have to be above the ignition point if auto ignition (i.e. without spark plug) is desired.

Rotary Valve represents a single rotational body, having opening(s) strategically located to match, at certain point of valve's rotational travel, with fixed intake, exhausts, input and output ports of engine's cylinders.

When valve position is such that the intake and exhaust opening, say 131, matches the intake port, say 115,—the intake valve opens, allowing free flow of fresh air or air/fuel mixture into the engine cylinder, 110. When valve position is such that the intake and exhaust opening, say 131, matches the exhaust port, say 116,—the exhaust valve is open, allowing free flow of exhausts out of engine cylinder. There exists a point within valve rotational limits, when both valves are in close position, see FIG. 11*g*).

Similarly, valve's input opening, 133, has to be lined up with input port 111 to allow inflow of working liquid into the cylinder, 110, and output valve, 134, opening has to be lined up with output port, 112, to allow outflow of working liquid out of the cylinder, 110. It should be noted that with such an exemplary configuration of working liquid valves, there is no need for directional valves 510 and 520. Also, directional valve 530 (not shown on FIG. 11) can be implemented in substantially the same way as valves 133 and 134.

It should be noted that the body of Rotary Valve, 130, shown on FIG. 11*a*)—FIG. 11*c*) has one "intake and exhaust opening" per cylinder (131 for cylinder 110 and 132 for cylinder 120). These opening matches either input (115 for cylinder 110, and 125 for cylinder 120) or exhaust (116 for cylinder 110, and 126 for cylinder 120) ports located on engine's block at certain point of valve's rotational travel. It is also possible, for Rotary Valve to have separate intake opening and exhaust opening per each cylinder (not shown).

In the instances when fuel is presented in a gaseous form, such as NG, or NG reformat or evaporated gasoline or diesel fuel, etc., such a gaseous fuels may be inserted into the engine's cylinder even if gas is at low pressure. This could be accomplished by having in addition to intake, 131, and exhaust, 132, opening(s), an extra low pressure fuel cavity, 135, or cavities, which, during certain point of Rotary Valve rotational travel, will match fuel port(s), 141. The cavity will then be filled with fuel in the amount proportional to fuel gas pressure and size of the cavity itself. If more then one cavity is used—they will be filled in a sequence. As Rotary Valve turns, the fuel will be introduced—"inserted"—into the cylinder, at the point when pressure within the cylinder reaches the desired value. Moreover, if more then one cavity is used, the fuel will be inserted in gradual increments thus improving the combustion. If desired, the fuel from additional cavities could be delivered during expansion phase as well.

The amount of energy, necessary to introduce fuel into the cylinder with such an arrangement is very small and is independent in a first approximation of the pressure within the engine cylinder. It may be advantageous, in some instances to introduce fuel together with liquid water, which may be added into the same with fuel cavity or a separate cavity. Also, it is possible to have a number of independently driven valves, each valve serving one cylinder. The Rotary Valves shown on shown on FIGS. 11*a*) through 11*d*) are of cylindrical shape. They could also be implemented in a form of a disk (not shown).

The Rotary Valves could be designed to be driven continuously or intermittently either by output shaft of PCM or by an independent electric motor with a controller.

To increase efficiency and decrease production of harmful emission, it may be desirable to increase the water vapor content of a working gas. To accomplish this, the water may be added to the cylinder during the compression phase from the top. This can be done by installing a thin-wall cylinder 114 (124), as shown in FIG. 3*b*). The thin-wall cylinder 114 (124) is closely placed to the wall of corresponding cylinder. This creates a narrow annular gap between the thin-wall cylinder 114 (124) and inside wall of the cylinder 110, (120). Working liquid is supplied through the vortex check-valve 117 (127) into this annular gap. It rises to the top of cylinder and while rising it picks up the heat from gases being compressed inside the cavity.

This reduces the compression work by having the compression process closer to isothermal as compared to Otto or Diesel engines. In addition, this heat is not lost, as in conventional motors to cooling water, but is used to evaporate the water entering into the cavity (118, 128). Thin walls are used to enhance the heat transfer—there are no deforming loads on this cylinder during its operation because the pressure is equal on both sides. Thus cavity (118, 128) shown on FIG. 3*b*) will contain more vapor than in the case shown on FIG. 3*a*). It should be noted that addition of water vapor to the air or air/fuel mixture would necessitates additional work during compression—this work will be recovered during the expansion cycle.

Additional means of increasing the amount of vapor during combustion include increasing the surface of the liquid piston. Also, adding water through small holes at the top of thin-walled cylinder (114, 124) will increase the surface area of evaporating water. If, for whatever reasons it might be desirable to introduce water from the bottom of the cylinder—two thin-walled cylinders could be used instead, as shown on FIG. 3*c*).

Alternatively or in addition to methods above, additional evaporation may be accomplished by having an elliptical concave shape of the top the cylinder (where intake and exhaust valves are located). This will focus the shockwave created in a result of "explosion" of gases within the cavity onto the surface of the liquid, creating a "fountain" of small droplets, which will increase the evaporative surface even further.

It may also be desirable to change the effective evaporative area during the compression or expansion. If the cavity of the cylinder has a conical shape—the surface area of a liquid piston will effectively change during the compression and expansion cycles.

On the other hand, it may be desirable for some variations of design to limit the amount of vapor within the cavity (118, 128). A float may be used to limit the surface of working liquid exposed to hot gases.

Figure 4:
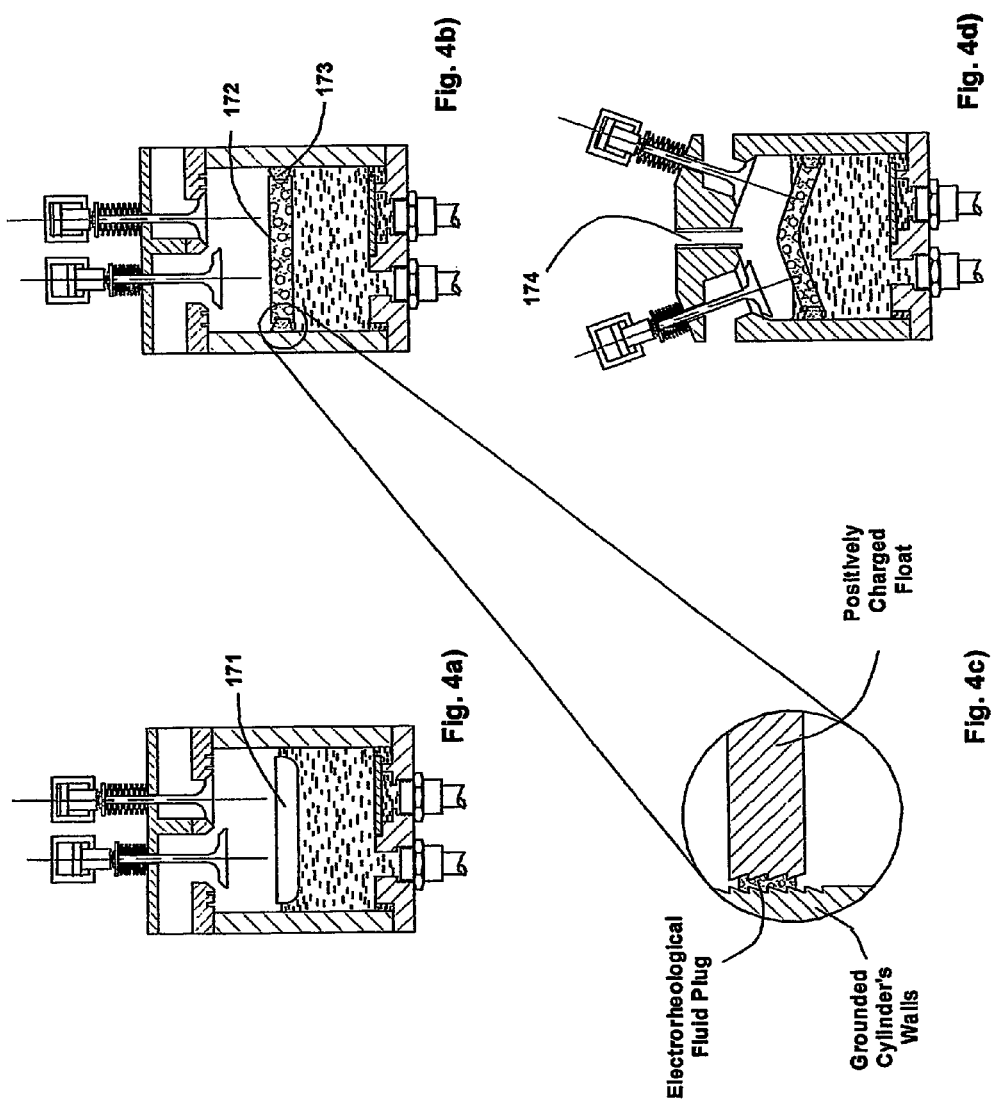
FIG. 4 shows additional details and modifications to basic design of a PGM wherein further:
  (i) FIG. 4(*a*) shows cylinder with simple float.
  (ii) FIG. 4(*b*) shows cylinder with magnetic float.
  (iii) FIG. 4(*c*) shows details of electrorheological fluid plug.
  (iv) FIG. 4(*d*) shows use of two different types of working liquids.

A few exemplary float designs are shown in FIG. 4. Simple float (171) is shown on FIG. 4*a*). Referring to FIGS. 4*b*) and 4*c*) Magnetic float (172) with magnetorheological seals (173) could be used, if desired, to entirely eliminate water vapors from entering the cavity (118, 128). Alternatively, the magnetic float (172) may be a conductor and seal (173) could be electrorheological fluid. This may have an added advantage of acting as a valve (520, FIG. 2) upon application of strong electric field. If walls of the cylinder and of float are formed as shown on FIG. 4*c*), the plug formed by the electrorheological fluid will prevent movement of the float even under very high pressures.

An embodiment shown in FIG. 4*d*) allows using two different types of liquids: water, above the float and a secondary working liquid below the float. The float could be, optionally, sealed with the help of magnetorheological or electrorheological seals. Water will have to be added into the cylinder with a separate pump (not shown) through an additional valve (174).

To change from one type of working fluid to another, commercially available or custom-built boosters may be employed. While FIG. 12 presents a separate booster option, it has to be understood, by those skilled in art, that booster could be integrated with the main cylinder of PGM.

The secondary working fluid could be hydraulic oil or conductive fluids such as low melting temperature metals, (mercury, liquid potassium or gallium alloys), alkalis, or electrolytes as shown in U.S. Pat. No. 6,068,449, which is incorporated herein by reference.

The use of conductive liquid allows direct conversion of kinetic energy of the working liquid into electricity inside of a magneto-hydrodynamic generator (FIG. 8), in which conductive liquid flows in the slit formed by magnets and current is formed in the direction perpendicular to both magnetic field and working liquid velocity. During the expansion phase, such a magneto-hydrodynamic generator will generate electrical current for an end user as well as charge a small electrical storage device, such as a super capacitor.

During the intake and exhaust phases, the current (from super capacitor) will be applied to a conducting fluid, forcing it to flow as in a pump (U.S. Pat. No. 6,068,449). Thus both functions of the PCM will be fulfilled.

It is possible, furthermore, to create high efficiency electrical generator system without any moving parts except the flowing working fluid.

The principle of operation of such a device is shown in FIG. 10. This figure shows one of two cylinders, say 110, comprising the PGM and undergoing the four-stroke cycle. Intake valve, exhaust valve, check-valve and directional valves are imbedded within the cylinder and implemented with the help of electrorheological fluid, which can change from fluid to solid under the action of high voltage electric field in a matter of millisecond or less [Proceedings of the 1999 SPIE Tele-manipulator and Telepresence Technologies VI Conference, Boston, Mass, Sep. 19–22, 1999, Vol. 3840, pp. 88–99].

The valves are formed by fluid in situ, when liquid fills the grounded pipe, 181, and positive potential is applied to a wire, 182, coaxial to pipe, 181. The electromagnetic field solidifies the electrorheological fluid to form a solid plug and blocks the passage as long as electric field is applied. All the valves within the system could be implemented in this way. Blocked passages are shown in symbolic way as a "plug" (183) of solidified electrorheological fluid. Preferably, an aqua-based electrorheological fluid is used if an energy recovery system is to be implemented.

The PCM in such a no-moving-part system will need to be implemented on the basis of a magneto-hydrodynamic generator, described above. Such a magneto-hydrodynamic generator requires the use of conductive working liquid, so the electrorheological fluid cannot be used directly in the PCM. The pressure generated by electrorheological fluid in the PGM will need to be converted into the pressure of second, conductive working liquid. This could be easily accomplished within a cylinder with a float that uses a magnetic float with magnetorheological seals, similar to one shown on FIG. 4d), except that the float will separate aqua-based electrorheological fluid and a second conductive working liquid, or any other suitable booster type.

As it was stated above, the absence of a rigid piston opens the possibility of many useful modifications of the basic design. A non-cylindrical surface of cylinder is one such useful modification. The cross section that repeats the basic outline of intake and exhaust valves (FIG. 3a) cross-section A—A) eliminates the need for 4 valve per cylinder designs, which are popular with modern engines, while still reducing throttling losses.

Another benefit of a liquid piston is that intake and/or exhaust valve assemblies could be located inside the cylinder. Still another potentially useful arrangement is to have conically shaped cylinder head with matching rotational valve, which has a window of suitable side. When valve rotates, the window may be placed in line with one of two openings: the first is an intake and second is an exhaust. During compression and expansion phases the window is closed against the rigid wall of housing (i.e. the valve's window is not overlapping the opening ports in the cylinder's head). If valve's cylinder is made of sufficiently thin and flexible material, such as stainless steel or other suitable material, the pressure exerted by the working liquid and/or gas will press the flexible cylinder material and provide for reliable sealing.

Energy Recovery System

The Energy Recovery System (ERS), 200, may be implemented in a variety of ways:
1. Endothermic reforming of incoming raw fuel into a reformat whose heat of combustion is higher then corresponding heat of combustion of raw fuel. Hot exhausts from PGM supply the needed heat for the reforming reaction and therefore the energy of exhausts gases is partially recovered.
2. Dissociation of water (steam) molecules in presence of catalyst and possibly assisted by electric spark discharge into Hydrogen and Oxygen.
3. Preheating of combustion air.
4. The combination of all mechanisms above either alone or in combination.

Endothermic Reforming

An embodiment of the Energy Recovery System, which is based on Endothermic reforming of incoming raw fuel, may be implemented as follows.

Figure 5:
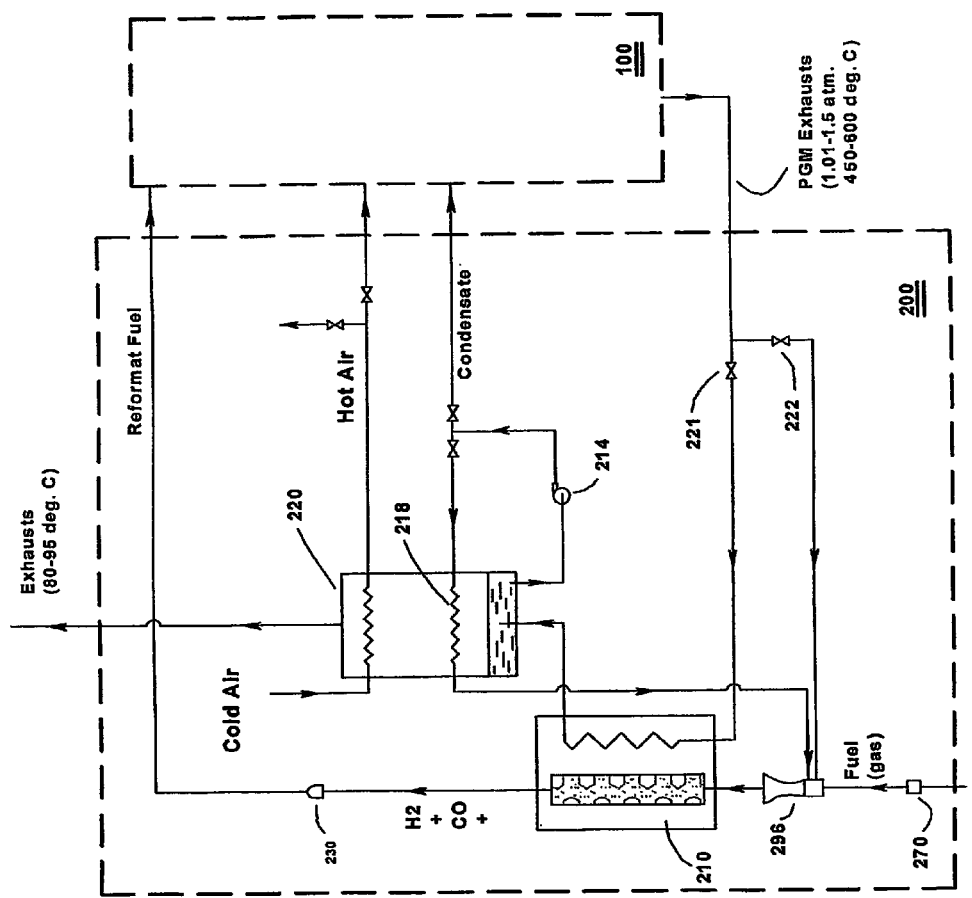
FIG. 5 is a block-diagram of one possible exemplary embodiment of the ERS.

As shown on FIG. 5 ERS, 200, may have two energy recovery units: the thermo-chemical recuperator (TCR), 210 and a condenser, 220, which can be a standalone unit or could be a part of TCR. FIG. 5 shows a standalone unit.

The ERS, 200, serves a plurality of purposes.

First, it converts raw fuel—such as hydrocarbon gas—into reformat mixture gas, which has about 25% higher heat of combustion then raw fuel gas. The conversion occurs in TCR, 210, in a course of endothermic, catalyst-assisted reactions at a constant temperature between 450 and 750 deg. C, depending upon the properties of the catalyst and amount of water vapor and/or carbon dioxide. The additional energy needed for this conversion comes from the exhausts gas. This exhausts gas contains a large amount of water vapor, formed as a result of the combustion process and by evaporation from the liquid piston surface as well as carbon dioxide; both of these substances aid in the reforming process when mixed with raw gas in a mixing chamber, 296. Injection pump, driven by pressure of gaseous fuel and/or by additional steam could be used as such mixing chamber. Valves, 222 and 221, control mixing proportion of raw fuel to exhausts. The heat energy needed for reforming reaction comes from exhausts gases in two ways: by physically mixing it with raw gases and also through a heat exchanger within TCR, 210.

Physically, the TCR is a heat exchanger containing a catalytic reactor: gaseous fuel passes on one side of such heat exchanger, while exhausts gases are heating other side. The fuel side may be filled with granular catalyst or, alternatively, catalyst may be deposited on the surface of heat exchanger internal to fuel passage. The heat released by exhausts gases is transferred to fuel being reformed, accomplishing the main purpose of Energy Recovery System.

A second purpose of the ERS is water recovery. Because water must not leave the system at a rate greater than the combustion process generates it, the water has to be recovered from the exhausts, so the exhausts must be cooled to below 100 deg. C.

The exhausts gases, which, exit TCR, are still hot, having temperature between 300 to 400 deg. C. and contain water vapors. This water has to be condensed and returned to PGM, 100, which is accomplished in heat exchanger 220, which condenses the water contain within exhausts gases by cooling them off with external cold air. The water is then returned to PGM, via PCM, as shown on FIG. 2. The hot air produced by heat exchanger, 220, may be used in cylinders, 110 or 120 of PGM, which will increase the efficiency of the engine when maximum power is not needed. The remaining fresh hot air will exit the system—this will constitute the only losses within the LPICPS. Alternatively, the hot air may be used for beating needs.

It may be necessary for efficient reforming of raw fuel to keep precise ratio of raw fuel to water to carbon dioxide to balance of exhausts. This may require injection of additional water vapor into the mixing chamber, 296. This additional water vapor may be readily produced with an optional boiler located within the heat exchanger 220. This boiler may have additional heat exchangers surfaces, 218, located within the condenser 220. The water is fed into this boiler by small water pump, 214.

The ERS may have an optional reformat accumulator 230, which smoothes out reformat supply pulsations, as well as optional liquid fuel evaporator and pump, 270, if the fuel is gasoline.

Figure 6:
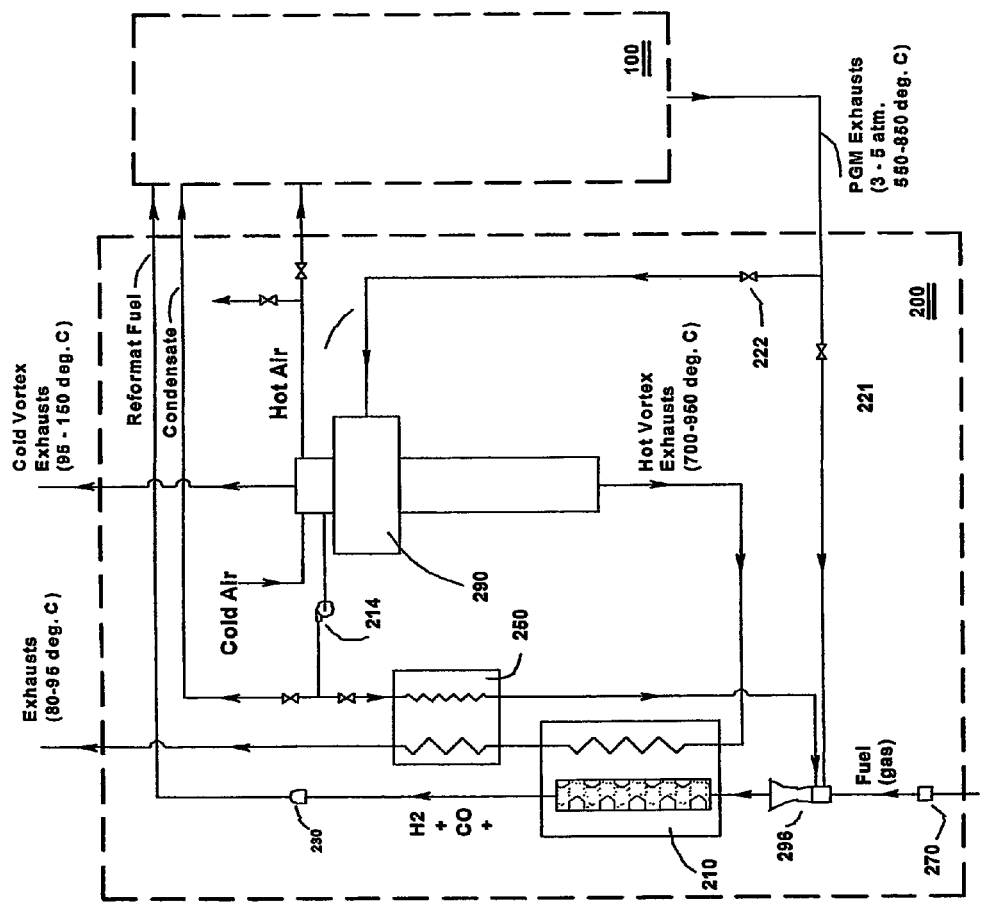
FIG. 6 is a block-diagram of another possible exemplary embodiment of the ERS.

A slightly different embodiment of ERS is shown on FIG. 6. Here vortex tube, 290, is used as an alternative to condenser, 220, of FIG. 5.

Referring to FIG. 6, PGM exhaust, 215, from PGM, 100, is split into two parts by valves 221 and 222. One part enters vortex tube, 290, while the second part enters a mixing chamber, 296. As in above case, the injector pump, 296, driven by the pressure of raw gaseous fuel, where it mixes up with these raw fuel gases and, if necessary with additional water vapor entering from small boiler 250. From mixing chamber/injector pump, 296, the mixture of raw fuel, exhausts gases, containing water vapor and CO2, and additional water vapors enters TCR, 210, As before, TCR reforms the raw fuel into the reformat gas containing hydrogen and carbon monoxide and some small amount of carbon dioxide, nitrogen, and water vapors and, possibly, some other gases, which then enter the PGM, 100, where it is used as a fuel for combustion. The TCR, 210, requires additional heat for reformation reaction and it receives it from the hot end of vortex tube, 290.

The vortex tube, 290, receives a portion of PGM exhausts, as was mentioned above, and, in turn, splits it into two streams: dry "Hot Vortex Exhausts", at temperatures in 700–950 deg. C range and a "Cold Vortex Exhausts", which may have temperature in the range of 95–150 deg. C, depending upon the pressure and temperature of PGM exhausts and the ratio of "cold" flow to "hot" flow. This ratio can be easily controlled, if needed, by adjusting the end screw of the vortex tube, as is shown on the web page http://www.exair.com/vortextube/vt page.htm. In addition, cold air flow may be used to help reduce the cold stream temperature and thus condense the water vapor contained in exhausts.

If temperature of this cold exhaust can be adjusted to fall below 100 deg. C, the water vapor contained in this "cold" exhaust will condense and small water pump, 214, will remove this condensate from vortex tube. Part of this condensate enters the small boiler, 250, while the excess of it, if any, is sent back to PGM. The air, heated after passing through the Vortex Tube, can be thrown out or could be used partially used for PGM needs, while rest is thrown out or used for cogeneration purposes.

Both Vortex Tube, 290, and/or small boiler, 250, are optional, because, based on the specific design, it may not be necessary to recover the water contained in the exhausts, as the combustion process may produce a sufficient amount of water to compensate for the losses of water exiting system with the exhausts.

Note, in an example above, while reasonable ranges of temperatures are given by means of example, it is entirely possible to operate outside of these ranges.

It should be noted that a complete ERS system or part thereof, could be built integral with (inside of or around) the cylinder of a PGM, in which case it would be a very simple matter to organize additional heat transfer between the cylinders (110, 120) to the ERS, 200, which might be needed for endothermic reaction.

Also, as in previous implementations of the ERS, the reformat gas (in case of hydrocarbon raw fuel it is a mix of CO, $CO_2$, $H_2$ and some other gases) has a heat of combustion significantly higher than that of raw fuel.

The third alternative approach is to reform raw gas directly within cylinder (110, 120) during the compression phase. If the cylinder contains a suitable catalyst, such as nickel, either on the surface of walls or as a mesh inside the cylinder, or in any other suitable form, the process could be implemented as described below.

At the end of exhaust phase, while there is still exhausts gas and water vapors in the cylinder, the exhaust valve (116, 126) closes and the intake phase begins. Fresh air and raw fuel are allowed into cylinder through normal means or by direct injection. The compression phase that follows generates a sufficient amount of heat and water vapor for reforming to occur on the catalyst surfaces. The amount of exhaust remaining within the cylinder is controlled by the position of the liquid piston during the exhaust phase. The heat generated during compression and normally wasted as well as heat contained in the remaining exhaust/water vapor is absorbed during the course of an endothermic reaction by raw fuel. The resulting reformat will have the heat of combustion higher than the initial raw gas by the amount of heat recovered. This process is very simple and practically "free" since it does not require any additional equipment other than catalyst coated walls or mesh. An additional benefit is that it can be combined, if desired with the first two methods outlined above, if the amounts of heat and reaction rates are insufficient to reform all the raw fuel.

Dissociation of Water Molecules and Production of Additional Hydrogen and Oxygen Dissociation of water (steam) molecules in the presence of a catalyst and possibly assisted by an electric spark discharge into Hydrogen and Oxygen as claimed in U.S. Pat. No. 5,156,114 is also possible within the framework of this invention. The difference with the above referenced patent consists in the fact that we do not need to add water to the fuel to implement this process, as water vapor will be present automatically by virtue of the LPICPS design. The heat generated during the air/fuel mixture compression may supply a significant part of the energy needed for such dissociation. Hydrogen generated in the process of dissociation is used during combustion. Thus, the net effect of this process is partial recovery of the heat of compression.

Note: It is also an advantage of this method that it can be used in combination with any of the Endothermic Reforming methods discussed above.

Power Conversion Module

The Power Conversion Module 300, as was mentioned above has to convert, in some cases, the kinetic energy of working liquid into the end user form. This end user form could be mechanical energy of rotating shaft(s) or electrical energy. The PCM also has to pump out the working liquid from the cylinders of the PGM during the intake phase and pump working liquid back into the cylinders of the PGM during the compression and exhaust phases, and, if needed, pump out any condensate of the working liquid from the ERS, 200. The energy conversion is optional because the kinetic energy of working liquid could be used as an end product in some applications such as water jet propulsion or water jet cutting equipment.

Transformation into mechanical energy may occur in such a device as a hydraulic motor, which in turn can rotate/move a useful load such as a car's transmission or wheels, if more then one hydraulic motor is used. Alternatively, such a hydraulic motor can drive an electrical generator to produce electricity.

Because the PCM is used for pumping out of the working liquid as well, it is preferable to use high efficiency motors/pumps, such as seen on web pages http://www.artemisip.com/tech advs.html or http://www.newtonmfgco.com/volvof11.htm, both sites last visited on Jan. 27, 2003, attached hereto or any other suitable high efficiency motors/pumps. These units work as a hydraulic motor when high pressure is supplied and as a pump when driven by external sources. A flywheel could be utilized effectively to drive the unit when high-pressure expansion flow is switched off. A flywheel gains the energy during the expansion phases of the engine and powers the pump during intake, compression and exhaust phases.

Another option for implementation of the PCM is to convert the kinetic energy of working liquid into electricity directly. The example of such an implementation is shown in FIG. 8. The pressure generated within the cylinders (110, 120) of PGM 100, is transferred from PGM working fluid, such as water, to the PCM's, 300, conductive fluid by boosters (311, 321). An example of such a conductive fluid is liquid potassium (as shown in U.S. Pat. No. 6,068,449 incorporated herein by reference), or other low melting temperature metals or alloys, such as mercury or gallium alloys. Other suitable conductive fluids could be alkalis, or electrolytes (as shown in U.S. Pat. No. 6,241,480 incorporated herein by reference). The use of conductive liquid allows direct conversion of the kinetic energy of conductive working liquid into electricity inside a magneto-hydrodynamic generator, 320, in which conductive liquid flows between two magnets and current is formed in the direction perpendicular to both magnetic field and the velocity of working liquid flow.

The magneto-hydrodynamic generator could function as a completely reversible device. For example, if current is passed through the conductive fluid situated between the magnet poles, it will move, once again, in the direction perpendicular to both magnetic field and supplied current (U.S. Pat. No. 6,068,449). Thus, such a reversible magneto-hydrodynamic system may function alternatively as generator and a pump and, therefore, will satisfy the requirements of the PCM.

The conversion of pressure from the PGM working fluid to the PCM working fluid could be accomplished within commercially available boosters, as shown on FIG. 12 or, alternatively, within the cylinders (311, 321, FIG. 8) which utilizes piston with electrorheological or magnetorheological seals or simple diaphragms to separate two types of fluid.

Operating cylinders at a frequency 60 Hz will generate electricity compatible with US power grids. Similarly, operating cylinders at other frequencies will generate electricity compatible with other countries power grids.

Hydraulic Shock Absorbers

Referring again to FIG. 2, an optional Hydraulic Shock Absorbers (HSA), 400, absorbs the energy of the flowing working liquid when the PGM is shutoff and releases this energy to the flowing working liquid, during the expansion phase.

The HSA can be employed if hydraulic shock presents a problem. For a one or both cylinders LPICPS, a problem may occur during the initial combustion phase when the check-valve is closing due to the pressure generated within the cylinder and before the directional switch can redirect the working liquid into the different cylinder. During this very short but finite time, the kinetic energy of the working liquid and flywheel (if such is employed on the hydraulic motor/pump), cannot be readily dissipated and will result in destructive forces within the system. The HSA system will dissipate this energy by compressing the air trapped therein. This system is optional because if, for example, 4 cylinders are used, the working liquid will be diverted into the other's cylinder 2 pair's channel and no shock will occur. Alternatively, if ignition based timing is used—the directional valve located downstream from the PCM can be activated an instant before the combustion begins, thus avoiding the hard stop of the check-valves.

The HSA module could be placed in many places within the LPICPS: in parallel with the PCM, upstream or downstream from the PCM as would be appreciated by those of ordinary skill in the pertinent art. FIG. 2 shows a parallel to PGM placement, which does not require any additional control elements and associated logics. The physical implementation of such a system can be as simple as drilling a blind hole within the body of the LPICPS. This is similar to a standard solution used in household plumbing systems, which eliminates the "water hammering" with the help of an air filled pipe, which accepts the water impact The deficiency of such a solution is that over a long time the air trapped within the cavity and which serves as a shock absorber dissolves in the water thus effectively eliminating its absorbing capabilities. To prevent this, the system can be automatically flushed, say, during the engine shutdown sequence or during regular maintenance, if the engine is operating without shutdowns. Alternatively, bladder type absorbers (air is in a separate rubber bladder) can be used. Additional HSA modules could be placed, if necessary, downstream from the PGM and before the PCM to "soften the blow" of exploding gases within the PGM on the hydraulic motor of the PCM.

The important aspect of the HSA system is that all the energy spent on compression of air after the check-valve closes and before the directional switch redirects the working liquid into the different cylinder is released back to the energy of the flowing working liquid after pressure is dropped in the cylinder at the end of expansion phase.

Data Acquisition and Control Module

Optional Data Acquisition and Control system, 500, controls the direction of working liquid flow to and from cylinders, as well as operation of intake and exhaust valves and combustion timing.

The DAC system may be comprised of a Programmable Logic Controller (PLC) or microprocessor, hydraulic and/or pneumatic and/or electromagnetic valves and sensor group.

The sensor group may comprise sensors for pressure, level, temperature, oxygen and any other suitable parameters' measurements.

The DAC system is also responsible for optimization of energy consumption during various power levels of operation of the system.

The DAC system is optional, since valve configuration shown on FIG. 11a)–c), can be driven by the output shaft of the PCM. Alternatively, as was explained above, the single valve configuration shown on FIG. 11a)-c), could be driven by separate electric engine, in which case DAC may serve as a controller for such an engine.

Auxiliary Equipment Module

Finally, the Auxiliary Equipment Module 600 provides auxiliary functions to the LPICPS, and may have such optional components as:

a) Electrical power source (such as battery and power conditioning unit) for start-up of the engine and/or DAC operation;
b) Electrical starter;
c) Additional accumulator(s) for driving the directional control valves or hydraulic valve lifters and the like;
d) Additional heat exchanger(s), which may be required for cooling of returned water (eg., a "radiator"), could be installed before the PCM or at another suitable location;
e) A separate cylinder in which working liquid may compress air for use in two-stroke engines and the like;
f) High-pressure accumulator that could also be used for start-up or braking energy recovery, if the engine is used for vehicular propulsion. This accumulator could be a stand-alone unit or, alternatively, it could be combined with an HSA. The energy of compressed gases, such as air, nitrogen, or other inert gases, within such an accumulator could be used to initiate the startup sequence within the LPICPS. This will eliminate the need in a starter and large battery. A small battery, or even a super capacitor, will supply the only energy needed to open the valve allowing working liquid to flow from the accumulator into the cylinder, which will undergo the compression phase. Alternatively, it can direct pressurized working liquid into the PCM to start the flywheel moving. If the engine is used for vehicular propulsion, the excess energy available during the breaking could be used to compress the gas in the accumulator in question. The compression will be performed by the pump/motor of the PCM.

LPICPS Benefits

The efficiency of any heat engine can be increased by essentially three different processes: increasing thermodynamic efficiency of the cycle, reduction of losses and recovery of lost energy. This invention's approach is to utilize all three mechanisms. The following explains how the efficiency of the proposed invention is increased by comparing it with an ICE operating under a standard Otto cycle. The invention offers at least the following benefits:

1. It is known in the art that V=const (isochoric, Otto cycle) combustion is generally more energy efficient then P=const (isobaric, Diesel cycle). Otto cycle efficiency is only a function of compression ratio ($V_1/V_2$). For a Diesel cycle, the dependency is more complicated. It is also known, that in spite of an inherently less efficient cycle, the engine with P=const normally has higher efficiency because they allow higher compression ratios. In Otto engines, during the compression cycle 1→2 (FIG. 9) the compressed mixture contains fuel. Since there exists a mechanical linkage between the cylinders, Otto cycle engines intentionally limit the compression ratio by firing a sparkplug to initiate combustion prematurely. This ensures that combustion happens at or near the top dead center of the stroke; otherwise, the engine may fire before the top dead center, thus counteracting the other cylinders. In the proposed invention, the cylinders are not linked mechanically, so they can be fired spontaneously at a point when temperature within the cylinder reaches the auto ignition point. This will normally occur at higher compression ratios. Also, if Low Pressure Fuel Insertion is used, very high compression ratios, limited only by strength of materials, could be used. That is why sparkplugs are optional for the proposed invention. Furthermore, because of presence of large amount of water vapor in the compressed mixture in the proposed invention, the auto ignition is retarded, i.e. occurs at still higher compression ratios. Both of these factors contribute to higher thermodynamic efficiency of the proposed engine.

During compression phase 1→2 (FIG. 9), the conventional engine has to be very efficiently cooled—this reduces the work required for compression. During the combustion 2→3 (FIG. 9) phase, when the heat of combustion is added to the working gas (combustion gases), cooling of the engine leads to the reduction of the amount of added heat and, thus, lowers the efficiency. Cooling, however, is essential to prevent the mechanical failure of components. In the proposed design, the cooling during compression mode is accomplished by the evaporating working liquid and heat of evaporation is utilized later during the expansion process, as was outlined before, when steam within the cylinder will exert additional pressure on the surface of liquid piston. Thus no special provisions are made in this invention for cooling of the engine. This further increases thermodynamic efficiency of the proposed engine.

In standard Otto engines, the combustion is not truly V=const process because the piston moves for the finite duration of time during which such combustion occurs. The curve shown in dashed line on FIG. 9 demonstrates this point, i.e., there is no straight vertical line corresponding to 2→3, V=const process during which combustion occurs. The net result of this is that the real cycle has still lower thermodynamic efficiency as compared to an ideal Otto cycle. In the proposed design, in spite of the fact that combustion also is occurring during a finite time, combustion is a truly V=const process due to the fact that expansion cycle 3→4 starts only after outflow valve 520 opens. This valve opens only after combustion is complete, thus increasing efficiency further and reducing harmful emissions, whose origin is incomplete combustion.

2. Mechanical energy losses are reduced by eliminating the friction between the piston and the cylinder's walls. Mechanical energy losses are further reduced if Low Pressure Fuel Insertion is used, since no pump or compressor is needed for gaseous fuel delivery.

3. Additional energy saving occurs in the ERS, 200. There are two energy saving processes that are occurring within this system. First and outmost, the thermochemical recuperator 210 converts a large portion of heat energy from the exhausts gases into higher heat of combustion of reformat, as compared to raw gases. Theoretically, as much as 50% or more of the heat energy of exhausts could be recovered using this technique. In the process, the exhausts gases are cooled and water is condensed (and returned to PGM, 100). Second, still hot gases could optionally preheat air in the heat exchanger 220. Preheating air has an effect of reducing the mass of the fresh air and, thus, fuel entering into combustion chamber. This in effect will reduce the power of the engine. While this is not generally desirable, it only affects the engine during top power demand, which normally occurs 5%-10% of all operating time. During this high power demand, the air could bypass the pre-heater, thus restoring full power at the expanse of a slight reduction in efficiency.

Operation

Raw fuel or the reformat fuel, consisting mostly of hydrogen, carbon monoxide, water vapor and some other components is mixed in the cylinder of an internal combustion engine with the air. The mixture is then compressed by a piston comprising of a surface of a working liquid. Such a working liquid is pumped into the cylinder by the pump/motor of the PCM, which is driven by a flywheel The compression of air/fuel mixture by the liquid piston constitutes a compression phase. When the mixture temperature reaches the auto ignition point, or is alternatively ignited by the spark plug, the combustion process begins. During the time that combustion occurs, the working liquid is trapped inside the cylinder by a check valve and a directional valve in dosed positions to maintain constant volume. The combustion proceeds to completion and a certain amount of working liquid evaporates in this process. Alternatively, only pure air is compressed in the cylinder to the desired compression ratio, preferably, to the compression ratio leading to auto ignition when raw fuel or reformat are inserted into combustion chamber. This fuel insertion could be accomplished by means of conventional Direct Fuel Injection (DFI), when fuel is inserted at the pressure equal or greater then pressure in the combustion chamber, or by means of Low Pressure Fuel Insertion (LPFI)—the process in which fuel is inserted at pressures significantly lower then pressure in the combustion chamber. This constitutes the combustion phase.

It should be noted that during combustion phase, the output shaft of PCM, if such is used, or, for that matter any output from PCM, is completely isolated or unaffected neither kinematically nor dynamically from the pressure in the cylinder. Thus combustion process is truly isochoric and kinematically and dynamically decoupled from PCM output means.

All the pressure in cylinders, generated by combusting gases, is taken or absorbed by valves. If rotational valves, rather than popped-type are used, rotating the valve to open the outflow of working liquid takes practically no more energy then if there is no high pressure in cylinders. That means that power required for valve's operation is independent in the first approximation (substantially independent) of the pressure within the cylinders.

After combustion is completed, the directional valve opens and the combustion product gases push the working liquid into the PCM and drive the pump/motor and flywheel This constitutes the expansion phase. The directional valve then closes, baring the flow of the working liquid from the cylinder and the exhaust valve opens. The working liquid is pumped back by the pump/motor into the cylinder and thus, the exhausts gases are pushed into the ERS, where the exhausts gases give off part of their energy to the reformat fuel and where water vapors condense. Exhaust gases are released into the ERS, where they give off part of their energy to reformat fuel and where water vapors condense. This constitutes the exhaust phase. The exhaust valve then doses; the intake valve opens; the directional valve opens and the working liquid is pumped out by the pump/motor. The fresh charge fills in the cylinder, constituting an intake phase, after which the cycle repeats.

Referring to FIG. 2 and FIG. 3, changing the level of the liquid within the cylinder 110 or 120 changes the volume of the cavity (118, 128) within these cylinders. During the initial stage of operation (point 1, FIG. 9), this cavity is filled with a fresh charge of air-fuel mixture or fresh air, in case of direct fuel injection or Low Pressure Fuel Insertion. This fresh charge is then compressed by adding more liquid into the cylinder (by moving up the liquid piston surface). The addition of liquid is accomplished by the PCM after directional valve (520) closes output of the working liquid from the cylinder. The compression, and associated heating of fresh charge continues until the air-fuel mixture reaches auto ignition temperature or until a spark plug fires or until certain compression ratio or pressure is reached (point 2, FIG. 9). In the process of compression, some of the water evaporates from the surface of liquid piston and/or from incoming working fluid streams, which will be described below. Evaporation of water may be very beneficial for increasing the efficiency and reduction of harmful emissions, as will be described below.

Combustion then starts when air/fuel ignition temperature is achieved, or when optional spark plug fires, or when fuel is injected or inserted into hot compressed air, assuming that the air temperature is above the ignition temperature of the fuel. When combustion starts, a few things are happening. The pressure within the dosed cavity sharply increases. The check-valve (117, 127) doses up. The temperature within the cavity continues to climb. Water continues to evaporate. All of this continues until all fuel is burned. The increased water content in the exhaust reduces the level of harmful emissions from the LPICPS[*"The Hydrogen World View"*, Roger E. Billings, $2^{nd}$ edition *International Academy of Science*, pp. 31–32]. Also, because the process is truly isochoric, the efficiency of the cycle is increased even further. Pressure sensors (not shown) signal the DAC system at about the start of combustion and, indirectly, at about its completion.

When combustion is complete (point 3, FIG. 9), directional valve (520) opens the cylinder in question and the expansion phase begins. Combustion products force the working liquid under the pressure from the cylinder (110, 120) into PCM (300), where its kinetic energy will be converted into user-definable form. The liquid piston moves down. Pressure within the cylinder falls, water, remaining in superheated form, continues to evaporate aiding in the expansion process. The entire vapor already contained in the working gas aids the expansion process as well. Thus the heat energy normally wasted during the compression of a fresh charge is returned to the system. Working gas may be expanded significantly beyond the initial intake volume. This is shown by extending point 4 to the right of point 1 on FIG. 9. Significantly larger expansion is possible by having a large amount of vapors in the exhausts. This can considerably increase the thermodynamic efficiency of the proposed engine.

At the end of expansion phase (point 4, FIG. 9), the directional valve 520 is closed again and the exhaust phase begins. The exhaust valve (116, 126) opens and combustion products, which we will call PGM exhausts at this point, are exhausted from the cylinder by the liquid piston moving up and driven by PCM. These PGM exhausts, at this point, still contain a lot of high-grade heat and, possibly, some pressure. They are directed to Energy Recovery System, 200, where part of this energy will be recovered. The exhaust phase continues until the liquid piston is at its uppermost position (determined by level sensor or other means, not shown), at which point exhaust valve (116, 126) closes and intake phase begins. This corresponds to point 5, FIG. 9.

The intake valve (115, 125) opens admitting fresh air-fuel mixture or just fresh air, if direct fuel injection is used, into the cylinder. The liquid piston moves down (working liquid is pumped out) driven by PCM, operating in its pump mode now. The intake continues until the initial point 1, FIG. 9, is reached. The cycle repeats then.

Two-Stroke Operation of the LPICPS.

It should be noted that the LPICPS could also operate on two-stroke cycle. The operation will be similar to two-stroke Otto engines. The differences between the LPICPS operating on a two-stroke cycle and an ICE operating on a two-stroke Otto cycle are same as between the LPICPS operating on a four-stroke cycle and the ICE operating on a four-stroke Otto cycle.

Four-Stroke Operation of LPICPS.

A P-V diagram corresponding to processes occurring within the LPICPS is shown in FIG. 9 in which:
a) The intake phase corresponds to process 5→1.
b) The compression phase corresponds to process 1→2.
c) The combustion phase corresponds to process 2→3.
d) The expansion phase corresponds to process 3→4.
e) The exhaust phase corresponds to process 4→5.

Dashed lines show processes that are typical for spark-ignition engines, for which the Otto cycle is an idealized cycle. FIG. 7 shows a corresponding sequence of operation of the LPICPS.

Referring to FIG. 2 for component reference numbers and FIG. 7 for explanation of the sequence of operations. Initially the cylinder 110 (upper cylinder on FIG. 7) is in the intake phase and cylinder 120 (lower cylinder on FIG. 7) is in the compression phase. The phases are identified on FIG. 7a) by words "5→1 (intake)" for upper cylinder and words "1→2 (Compression)" for the lower cylinder. On FIG. 7, liquid flow is shown by comparatively thick lines in the direction of arrows.

The air or air/fuel mixture enters through the intake valve, 115, during the intake phase of the cycle. The liquid piston moves down, as an arrow within the cylinder indicates, by the pumping action of hydraulic motor/pump (310, FIG. 2), which operates in its "pump mode". This creates vacuum in the cylinder and air or air/fuel mixture, is inducted into the cylinder's volume. Alternatively, if direct fuel injection is used, only air may be inducted into the cylinder's volume during the intake phase and fuel may be injected or inserted after the intake valve is dosed. Within the exception of the liquid piston and the operation on reformat gas, this is very similar to the operation of a standard ICE operating under the Otto cycle. The hydraulic motor/pump is energized by flywheel or other cylinder pair, if two or more cylinder's pairs are used, as symbolized by the arrow directed toward the motor/pump.

The liquid that is being pumped out of 110 is pumped into cylinder 120, and, to a significantly lower degree into the small shock absorber, 420, which is not shown on FIG. 7 for simplicity. The shock absorber, 420, at this time is at the same pressure as cylinder 120. Since intake, 125, and exhaust, 126, valves are closed, the air/fuel mixture within this cylinder will undergo a compression phase (1→2). Shock absorber 420 does not have any valves at all, so the pressure therein keeps in sync with cylinder 120. The work needed for compression comes from flywheel and/or other cylinders undergoing expansion in 4, 6, or more cylinder configurations.

Referring to FIG. 7b) and FIG. 2, the mixture in cylinder 120 is compressed to pressures that correspond to an auto ignition temperature of the mixture, if no spark plug is used, or to desired pressure if fuel injection or insertion are used. Due to the presence of water vapors and the cooling action of evaporating water, this pressure will be higher than for "dry" reformat When auto ignition occurs, the check-valve 127 is shutoff and prevents liquid from flowing back to the PCM. The outflow valve 520 is still closing the outflow for cylinder 120, thus combustion proceeds to completion. Also, combustion proceeds under lower temperatures, due to the presence of water, reducing or eliminating completely the formation of $NO_x$.

Both of these factors significantly reduce harmful emissions from the engine. The pressure sensors detect sharp pressure increases during the combustion phase, and switch water flow to cylinder 110 by valve 510. As was mentioned above, there is a short but finite lag between combustion and the valve 510 switching. During this lag, the liquid keeps flowing toward the cylinder 120 and more specifically into the shock absorber 420. This increases the pressure within 420 beyond that of auto ignition pressure of cylinder 120. Of course, absorber 420 contains only air, so no ignition thereabout occurs.

Switching of directional valve 530 and closing of intake valve 115 occur simultaneously with switching of valve 510. Thus, water is pumped from the ERS, 200, into the cylinder 110, which starts the compression phase. The valve 520 is still closing the outflow for cylinder 120. The phase (shown in FIG. 7b)) occurs during a very short period of time, limited by the time needed for a complete combustion. Also, if the ERS condenser does not have a sufficient amount of water to prevent "dry" run by motor/pump 310, the working fluid may be taken from cylinder 110 and be returned back to the same cylinder 110, until cylinder 120 completes the combustion phase.

During the next instance of time, shown on FIG. 7c), the directional valve 520 opens the outflow from the cylinder 120, which starts the expansion phase 3→4. A very high water pressure in line 122 drives the hydraulic motor, 310, producing useful work, as symbolized by the double-arrow directed outward from the motor/pump, as well as accelerating the flywheel. The pressure within cylinder 120 drops and when it reaches that of the shock absorber 420, the check-valve 127 opens up. Water from 420 flows into cylinder 120 and then into line 122, leading to the hydraulic motor 210. Thus, the energy stored in the shock absorber (accumulator) 420 is released back into the system, with very little losses. The directional valve 530 switches simultaneously with 520, allowing water to flow from 120 into 110, thus continuing the compression cycle for cylinder 110.

Compression within cylinder 110 continues until auto ignition (or spark induced combustion) occurs. This is shown on FIG. 7d). The sequence of events here is in complete analogy with the cylinder 110 in FIG. 7b) and described above, including the shock absorber 410. The exhaust valve 126 of cylinder 120 opens up and the exhaust phase 4→5 begins for that cylinder. It is possible to exhausts gases into the ERS under pressure. The exhaust phase within cylinder 120 continues until cylinder 110 undertakes the expansion phase, i.e., FIG. 7e). Work is being produced once again by the hydraulic motor.

It has to be noted that because the LPICPS does not have mechanically linked cylinders, the expansion phase may terminate at point 4 (see FIG. 9), which is not necessarily at the same volume as point 1 of FIG. 9. To optimize the work of the LPICPS, it may be necessary to coordinate the PGM exhausts with the needs of the ERS, mostly in regards to temperature and pressure parameters. So, depending on the design intent and choice of energy recovery method, the catalyst and other parameters of the system, the expansion termination point 4 may be to the left from point 1 (which means higher exhaust pressures and higher temperatures) or to the right from point 1 (lower pressures, lower temperatures and chance for almost complete condensation of vapors), as seen in FIG. 9. It is also possible to temporarily suspend the expansion at any point between points 3 and 4 and cool the working gas either outside of cylinders, which will require additional "expulsion" and "pullback" phases or, while it is still inside of cylinders 110 or 120, and then resume the expansion. The heat and steam removed from working gas will be used to supply heat and steam needed for the reforming process or energy recuperation by the ERS.

Finally, in the next phase shown in FIG. 7f), gases are exhausted from cylinder 110, while cylinder 120 undergoes the intake phase. This concludes the cycle and the sequence is repeated.

It should be noted that internal combustion engines normally are optimized for efficient operation only in a narrow power ranges, in which they operate 60–70% of the time. The remaining time engines are extremely inefficient and polluting. The LPICPS operates efficiently at all powers. To explain this it is necessary to show how power level can be reduced, in addition to standard means of lowering the amount of fuel entering the engine. One or more of the following mechanisms, either alone or in combination, can be used to reduce the power level of the LPICPS:

1. By varying the initial intake volume, $V_1$, of the cylinder. Since the liquid piston is free to move and stop within the cylinder at any position (cylinders are not tied up mechanically), one can reduce the initial intake volume, $V_1$, (point 1 on FIG. 9 shifted left). This will effectively reduce the engine's volume and therefore power level, with minimal effect on efficiency of operation.
2. Increasing the timing of each cycle.
3. Operating on hot air instead of cold air, which enters carburetor/mixer (280, FIG. 5) (this reduces the heat rejected by the engine and thus increases the efficiency of the system).
4. By "disconnecting" one of the cylinders, say cylinder 120. Keeping the intake valve 125 open at all times and closing fuel valve 123 effectively turns the cylinder 120 into a vessel for temporary storage of liquid. The sequence of operations for the cylinder 110, shown on FIG. 7, remains essentially the same.

The efficiency of the system remains practically constant on all power level, except for some small increase when hot air is used.

The vapors created during compression phase and further by hot high pressure combustion products are very beneficial for purposes of creating additional work, as in steam engine, and reducing the peak temperature of the combustion process. Additional work is created in virtue of the following factors:

1. Water, when evaporated, occupies significantly larger volume than in liquid state (by three orders of magnitude).
2. Heat is not wasted by cooling the walls of the engine during the compression and expansion phases, as in a conventional engine. Instead this heat is used to add water vapors into the system. At the same time, the cylinder's walls do not overheat, because water evaporates and very effectively reduces the wall's temperature.
3. Combustion products, containing a great amount of vapors, may be expanded significantly beyond the initial intake volume, as was explained above. Increasing $V_4/V_1$ (Referring to FIG. 9) ratio from 1, which is typical for conventional ICEs to 2–3, may increase thermodynamic efficiency by 10–20%, depending upon initial compression ratio.
4. The compression ratio within the LPICPS can be higher than in conventional Otto cycle engines because the auto ignition, which will be achieved at higher then in conventional engines pressures, is not a problem but rather a desirable feature. Also, if direct fuel injection or especially Low Pressure Fuel Insertion are used, the compression ration could be set very high, limited only by strength of materials. Since the efficiency of Otto engines is only a function of compression ratio, the thermodynamic efficiency of the proposed engine can reach fairly high values. The qualitative comparison of the proposed cycle to real-life Otto cycle (dashed lines) is shown on FIG. 9.
5. Furthermore, the PGM exhausts contain relatively high-grade heat, which is easy to recover because it is mostly contained in a form of water vapors. Condensing this water allows recovery of a considerable amount of that heat. This is accomplished in the ERS, 200.
6. If a high voltage electric spark is used, (not necessarily to start the combustion, because the mixture will auto ignite when high pressures are reached) some of the hot vapor may dissociate, according to U.S. Pat. No. 5,156,114, forming hydrogen and oxygen in the process. While this process is well documented, as shown in this patent, we do not believe that that it can contribute to energy saving to such an extent, because this would violate the law of conservation of energy. In our case, the energy used during compression, which is normally wasted, may indeed be used to aid water dissociation, aiding somewhat to efficiency of the system.

Finally, harmful emissions are reduced because of the decrease in combustion temperature within the cycle.

The LPICPS can be thought of as a synergetic combination of internal combustion and steam piston engines within the framework of one and the same system. It provides improvements in thermodynamic and mechanical efficiencies as well as partial recuperation of rejected heat energy. It also reduces harmful emissions from the engine.

The thermodynamic efficiency is improved by utilization of a new cycle, which is an amalgamation of ideal Otto and Rankine cycles. Specifically, improvements are due to:

1. More efficient cooling of air or air/fuel mixture during the compression phase;
2. Utilization of higher compression ratio then normally achievable in Otto cycle engines;
3. Utilization of truly isochoric combustion; and
4. Incorporation of Rankine cycle within the Otto cycle where the working gas is comprised of combustion products, as in the ICE, together with high pressure steam, as in a steam engine. The steam is formed inside the cylinder itself, eliminating the need for a boiler and superheater. Some or most of the steam is condensed during the expansion cycle, eliminating or greatly reducing the size of the condenser The mechanical efficiency is improved by significant reduction of frictional losses between the cylinder and the metal piston, which in the given invention are replaced by a liquid piston, and by reduction of inertial losses associated with heavy piston-crankshaft assemblies.

The partial recuperation of rejected heat could be accomplished in a number of ways by: 1) increasing the heat of combustion of fuel in a course of endothermic reforming reaction with heat derived from compression of air or air/fuel mixture on a surface of catalyst, and/or at the expense of reduction of the heat content of exhausts gases;

2) dissociation of water (steam) molecules into Hydrogen and Oxygen in the presence of a catalyst, which may be assisted by a spark-generated discharge; 3) preheating the fresh air with exhausts; and 4) the combination of some or all of the above.

Harmful emissions from the engine are reduced by one or more of the following factors: 1) having lower combustion temperature; 2) exercising precise computer timing control of the combustion process; and 3) reduction of the amount of fuel needed to perform the same work.

The inventor has given a non-limiting description of the Liquid Piston Internal Combustion Power System of this invention. Due to the simplicity of the design of this invention designing around it is difficult Nonetheless many changes may be made to this design without deviating from the spirit of this invention. Examples of such contemplated variations include the following:
1. The shape, size, locations and ratios of various engine's geometric parameters may be modified.
2. Additional complimentary and complementary functions and feature may be added.
3. A more economical version of the device may be adapted.

Other changes such as substitution of newer materials as they become available, which substantially perform the same function in substantially the same manner with substantially the same result without deviating from the spirit of the invention may be made.

Following is a listing of the components used in the best mode preferred embodiment and the alternate embodiments. For the ready reference of the reader the reference numerals have been arranged in ascending numerical order, as well as in alphabetical order.

References Sorted by Numerals
100 Power Generating Module
110 Cylinder
111 Input Port (line)
112 Output Port (line)
113 Fuel Valve
114 Thin-Wall Cylinder
115 Intake Valve
116 Exhaust Valve
117 Check-valves
118 Cavity
119 Air Valve
120 Cylinder
121 Input Port (line)
122 Output Port (line)
123 Fuel Valve
124 Thin-Wall Cylinder
125 Intake Valve
126 Exhaust Valve
127 Check-valves
128 Cavity
129 Air Valve
130 Rotary Valve
131 Intake and Exhaust Opening
132 Intake and Exhaust Opening
133 Input Opening
134 Output Opening
135 Low Pressure Fuel Cavity
136 Intake Opening
137 Exhaust Opening
138 Intake Opening
139 Exhaust Opening
141 Fuel Ports
171 Simple float
172 Magnetic float
173 Magnetorheological seals
174 Water Valve
181 Grounded pipe
182 Wire
183 Plug
200 Energy Recovery System
210 Thermo-chemical recuperator
213 Valve
214 Water Pump
215 PGM exhausts
220 Condenser
222 Valve
230 Reformat accumulator
250 Boiler
270 Optional gasoline evaporator and pump
280 Carburetor or mixer
290 Vortex tube
295 Condenser
296 Injector pump or Mixing chamber
300 Power Conversion Module
310 Hydraulic Motor/Pump, hydraulic motor, Pump, motor
311 Booster
320 Magneto-hydrodynamic generator
321 Booster
400 Hydraulic Shock Absorbers
410 Shock Absorber
420 Shock Absorber, accumulator
500 Data Acquisition and Control
510 Directional Valve, Inflow Valve
511 Valve
520 Directional Valve, Outflow Valve
521 Valve
530 Directional Valve
570 Sensors
590 Computer
600 Auxiliary Equipment Module References Sorted in Alphabetical Order
119 Air Valve
129 Air Valve
600 Auxiliary Equipment Module
250 Boiler
311 Booster
321 Booster
280 Carburetor or mixer
118 Cavity
128 Cavity
117 Check-valves
127 Check-valves
590 Computer
220 Condenser
295 Condenser
110 Cylinder
120 Cylinder
500 Data Acquisition and Control
530 Directional Valve
510 Directional Valve, Inflow Valve
520 Directional Valve, Outflow Valve
200 Energy Recovery System
137 Exhaust Opening
139 Exhaust Opening
116 Exhaust Valve
126 Exhaust Valve
141 Fuel Ports
113 Fuel Valve
123 Fuel Valve 181 Grounded pipe
310 Hydraulic Motor/Pump, hydraulic motor, Pump, motor
400 Hydraulic Shock Absorbers
296 Injector pump or Mixing chamber
133 Input Opening
111 Input Port (line)
121 Input Port (line)
131 Intake and Exhaust Opening
132 Intake and Exhaust Opening
136 Intake Opening
138 Intake Opening
115 Intake Valve
125 Intake Valve
135 Low Pressure Fuel Cavity
172 Magnetic float
320 Magneto-hydrodynamic generator
173 Magnetorheological seals
270 Optional gasoline evaporator and pump
134 Output Opening
112 Output Port (line)
122 Output Port (line)
215 PGM exhausts
183 Plug
300 Power Conversion Module
100 Power Generating Module
230 Reformat accumulator
130 Rotary Valve
570 Sensors
410 Shock Absorber
420 Shock Absorber, accumulator
171 Simple float
210 Thermo-chemical recuperator
114 Thin-Wall Cylinder
124 Thin-Wall Cylinder
213 Valve
222 Valve
511 Valve
521 Valve
290 Vortex tube
214 Water Pump
174 Water Valve
182 Wire Definitions and Acronyms A great care has been taken to use words with their conventional dictionary definitions. Following definitions are included here for clarification.

AEM=Auxiliary Equipment Module
COMPRESSION FLOW=Flow of working liquids into the cylinder of a PGM under the pressure generated by the PCM. This flow compresses the fresh air or air/fuel mixture within the cylinder of the PGM.
DAC=Data Acquisition & Control Module
Dynamic Decoupling=Occurs when pressure or forces acting upon the liquid piston do not propagate (or being felt) by PCM output means.
ERS=Energy Recovery System
EXHAUST=Working gas expelled from the cylinder after combustion phase. These exhausts may undergo a number of changes throughout the various elements of LPICPS. To distinguish one type of exhaust from another they may be identified by the name of the element they are exhausted from, such as cylinder exhausts, vortex tube exhausts, and the like.
EXHAUST FLOW=Flow of working liquids into the cylinder of PGM under the pressure generated by a PCM. The cylinder exhausts are expelled from the cylinder of the PGM during this flow conditions.
EXPANSION FLOW=Flow of working liquids from the cylinder of a PGM under the pressure of working gases during the expansion phase. The useful work is extracted from the working liquid during this drive flow within the PCM.
ICE=Internal Combustion Engine
HSA=Hydraulic Shock Absorbers Module
INTAKE FLOW=Flow of working liquids from the cylinder of PGM under the pumping action of the PCM.
Integrated=Combination of two entities to act like one
Interface=Junction between two dissimilar entities
Kinematic Decoupling=Occurs when liquid piston moves within the cylinder without causing corresponding motion or output by PCM output means. Alternatively, Kinematic Decoupling occurs when liquid piston stops moving within the cylinder without stopping the PCM output means.
LPICPS=Liquid Piston Internal Combustion Power System
PCM=Power Conversion Module
PGM=Power Generating Module
WORKING GAS=A mixture of product of combustion and vapor(s) of working liquid that exists within the cylinder of the LPICPS during combustion and expansion phases.
WORKING LIQUID=Water or other liquid suitable for use in the LPICPS. There may be more then one type of working liquids within LPICPS.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

I claim:

1. A liquid piston internal combustion engine comprising:
 a) a power generating module having at least one cylinder and at least one piston comprising at least in part the surface of a first working liquid, thus forming a liquid piston, the power generating module also comprising a booster that converts energy of said first working liquid into energy of a second working liquid and;
 b) an output means to convert thermal energy generated in a process of combustion in said cylinder into non-thermal energy.

2. The liquid piston internal combustion engine of claim 1 wherein said booster is integrated with said cylinder.

3. The liquid piston internal combustion engine of claim 1 wherein the first working liquid is water.

4. The liquid piston internal combustion engine of claim 1 wherein the first working liquid is aqua-based electrorheological liquid.

5. The liquid piston internal combustion engine of claim 1 wherein the first working liquid is aqua-based electro-conductive liquid.

6. The liquid piston internal combustion engine of claim 1 wherein said second working liquid is water.

7. The liquid piston internal combustion engine of claim 1 wherein said second working liquid is electro-conductive liquid.

8. The liquid piston internal combustion engine of claim 1 wherein said second working liquid is hydraulic oil.

9. A liquid piston internal combustion engine comprising:
a) a power generating module having at least one cylinder and at least one piston comprising at least in part of the surface of a first working liquid, thus forming a liquid piston, the power generating module also including therein a cylindrical valve body having a plurality of valve openings; and
b) an output means to convert a thermal energy generated in a process of combustion in said cylinder into non-thermal energy;
wherein the cylindrical valve body includes at least one low pressure fuel cavity.

10. The liquid piston internal combustion engine of claim 9 wherein the first working liquid is an aqua-based electrorheological liquid and said system of valves is formed in situ by said aqua-based electrorheological liquid and includes: a) a grounded hollow body; and b) an insulated wire running through said grounded hollow body.

11. A liquid piston internal combustion engine of claim 9, wherein the power generation module further includes a directional valve located therein.

12. A combustion engine comprising:
a) combustion chamber;
b) an output means coupled to the combustion chamber that converts a thermal energy generated in said combustion chamber during a combustion process into non-thermal energy; and
c) wherein further said combustion process is isochoric and kinematically and dynamically decoupled from said output means.

13. The combustion engine of claim 12 wherein said output means includes the energy-bearing flow of first working liquid.

14. The combustion engine of claim 12 wherein said output means comprise a moving output shaft.

15. The combustion engine of claim 12 wherein said combustion within said combustion chamber is initiated by a spark plug.

* * * * *